United States Patent [19]

McConnell

[11] Patent Number: 4,567,610

[45] Date of Patent: Jan. 28, 1986

[54] METHOD OF AND APPARATUS FOR PATTERN RECOGNITION

[75] Inventor: Robert K. McConnell, Arlington, Mass.

[73] Assignee: Wayland Research Inc., Wayland, Mass.

[21] Appl. No.: 400,948

[22] Filed: Jul. 22, 1982

[51] Int. Cl.[4] .............................................. G06K 9/80
[52] U.S. Cl. ....................................... 382/18; 382/30
[58] Field of Search ..................... 382/18, 30; 358/107

[56] References Cited

U.S. PATENT DOCUMENTS

| | | | |
|---|---|---|---|
| 3,845,466 | 10/1974 | Hong | 382/18 |
| 4,075,604 | 2/1978 | DeGasperi | 382/18 |
| 4,231,014 | 10/1980 | Ponzio | 382/18 |
| 4,295,120 | 10/1981 | Yoshida | 382/18 |
| 4,323,880 | 4/1982 | Lucas | 382/18 |

OTHER PUBLICATIONS

Bishop et al., "Character Recognition Approach Involving Histogram Classification", *IBM Tech. Disclosure Bull.*, vol. 21, No. 9, 2-1979, pp. 3461-3467.

Vajda, "A Contribution to the Informational Analysis of Pattern", *Methodologies of Pattern Recognition*, edited by Watanabe, Academic Press: 1969, pp. 509-519.

Bongard, *Pattern Recognition*, Spartan Books: 1970, pp. 94-112.

Kovalevsky, *Image Pattern Recognition*, Springer-Verlag: 1980, pp. 67-90.

Watanabe, "Pattern Recognition as a Quest for Minimum Entropy", *Pattern Recognition*, vol. 13, No. 5, 1981, pp. 381-387.

*Primary Examiner*—Leo H. Boudreau
*Attorney, Agent, or Firm*—Schiller & Pandiscio

[57] ABSTRACT

A method of and an apparatus for analysis of patterns both in static and dynamic modes. A test histogram is described in terms of the optimum code described for a reference histogram.

52 Claims, 33 Drawing Figures

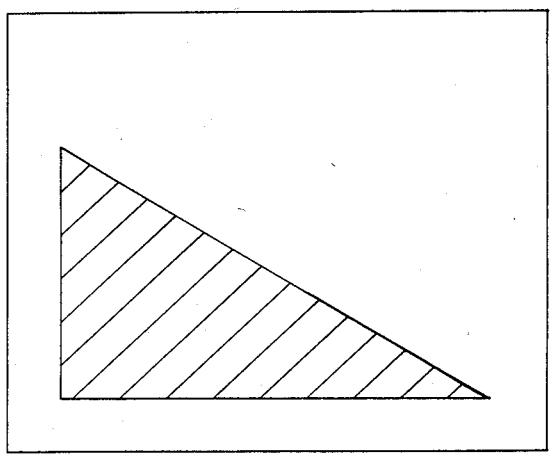
FIG. 1A
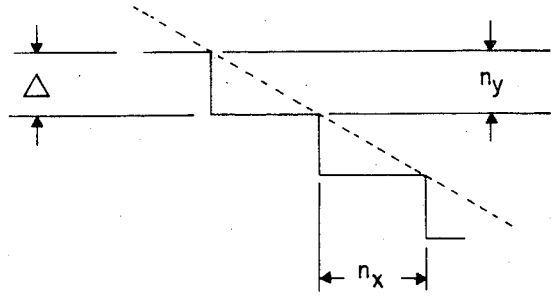
FIG. 1B
FIG. 1C

| SIZE AND SHAPE | FUNCTION | | | |
|---|---|---|---|---|
| | H(T:R) | I(T:R) | H(T:R)-H(T:T) | I(T:R)-I(T:T) |
| LARGE TRIANGLE ON LARGE TRIANGLE | | | | |
| EDGE - SLOPE | 1.56 | 268 | 0 | 0 |
| VALUE - ONLY | .93 | 3354 | 0 | 0 |
| SMALL TRIANGLE ON LARGE TRIANGLE | | | | |
| EDGE - SLOPE | 1.56 | 134 | 0 | 0 |
| VALUE - ONLY | 0 | 2489 | .26 | 967 |
| LARGE TRIANGLE ON SMALL TRIANGLE | | | | |
| EDGE - SLOPE | 1.56 | 268 | 0 | 0 |
| VALUE - ONLY | 1.29 | 4460 | .36 | 1107 |
| SQUARE ON LARGE TRIANGLE | | | | |
| EDGE - SLOPE | 9.2 | 918 | 7.2 | 718 |
| VALUE - ONLY | .93 | 3354 | 0 | 0 |
| SQUARE ON SQUARE | | | | |
| EDGE - SLOPE | 2 | 200 | 0 | 0 |
| VALUE - ONLY | .93 | 3354 | 0 | 0 |

*FIG. 7*

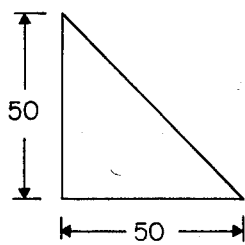
| 50 | 0 | 0 | 71 | 0 | 0 | 50 | 0 | $T_4$ |
|---|---|---|---|---|---|---|---|---|
| .292 | .001 | .001 | .416 | .001 | .001 | .292 | .001 | $R_4$ |
| 1 | 2 | 3 | 4 | 5 | 6 | 7 | 8 | |
FIG. 8
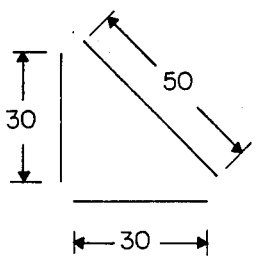
| 30 | 0 | 0 | 50 | 0 | 0 | 30 | 0 | $T_5$ |
|---|---|---|---|---|---|---|---|---|
| .273 | .001 | .001 | .454 | .001 | .001 | .273 | .001 | $R_5$ |
| 1 | 2 | 3 | 4 | 5 | 6 | 7 | 8 | |
FIG. 9
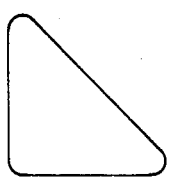
| 35 | 5 | 5 | 55 | 5 | 5 | 35 | 5 | $T_6$ |
|---|---|---|---|---|---|---|---|---|
| .233 | .033 | .033 | .367 | .033 | .033 | .233 | .033 | $R_6$ |
| 1 | 2 | 3 | 4 | 5 | 6 | 7 | 8 | |
FIG. 10
| REF. \ TEST | ◣ | ◥ | ◭ |
|---|---|---|---|
| ◣ | 0 | .01 | .26 |
| ◥ | .01 | 0 | .27 |
| ◭ | .63 | .63 | 0 |
FIG. 11

| 50 | 0 | 0 | 71 | 0 | 0 | 50 | 0 | $T_7$ |
|---|---|---|---|---|---|---|---|---|
| .292 | .001 | .001 | .416 | .001 | .001 | .292 | .001 | $R_7$ |
| 1 | 2 | 3 | 4 | 5 | 6 | 7 | 8 | |

| 50 | 0 | 50 | 0 | 50 | 0 | 50 | 0 | $T_8$ |
|---|---|---|---|---|---|---|---|---|
| .25 | .001 | .25 | .001 | .25 | .001 | .25 | .001 | $R_8$ |

| 20 | 20 | 20 | 20 | 20 | 20 | 20 | 20 | $T_9$ |
|---|---|---|---|---|---|---|---|---|
| .125 | .125 | .125 | .125 | .125 | .125 | .125 | .125 | $R_9$ |

| 75 | 0 | 0 | 60 | 50 | 60 | 0 | 0 | $T_{10}$ |
|---|---|---|---|---|---|---|---|---|
| .31 | .001 | .001 | .24 | .20 | .24 | .001 | .001 | $R_{10}$ |

| 70 | 20 | 20 | 91 | 20 | 20 | 70 | 20 | $T_{11}$ |
|---|---|---|---|---|---|---|---|---|
| .21 | .06 | .06 | .275 | .06 | .06 | .21 | .06 | $R_{11}$ |

| TEST \ RET | ◣ | ○ | □ | ⏢ | ◣○ |
|---|---|---|---|---|---|
| ◣ | 0 | 1.44 | 6.55 | .34 | .52 |
| ○ | 7.98 | 0 | 6.3 | 6.32 | .33 |
| □ | 7.19 | 1 | 0 | 7.3 | 1.15 |
| ⏢ | 2.66 | 1.02 | 7.17 | 0 | .51 |
| ◣○ | 3.43 | .32 | 5.98 | 5.03 | 0 |

| TEST \ RET | ◣ | ○ | □ | ⏢ | ◣○ |
|---|---|---|---|---|---|
| ◣ | 0 | 246 | 1112 | 58 | 89 |
| ○ | 1277 | 0 | 1009 | 1011 | 53 |
| □ | 1439 | 200 | 0 | 1462 | 230 |
| ⏢ | 652 | 249 | 1757 | 0 | 126 |
| ◣○ | 568 | 52 | 990 | 465 | 0 |

| | | | | | | |
|---|---|---|---|---|---|---|
| 3111G | 3133G | 3133G | 1303B | 1133G | 3313G | 1313G |
| 1301B | 3331G | 3131G | 3300B | 3131G | 1331G | 3131G |
| 3133G | 1111G | 3311G | 3121B | 3311G | 1331G | 2311B |
| 3033B | 1333G | 3111G | 3133G | 3111G | 1113G | 1111G |
| 3123B | 3111G | 3211B | 3131G | | | |

Table 1. Reference data set

| | | | | | | |
|---|---|---|---|---|---|---|
| 0213* | 1313 | 1311 | 3331 | 0231* | 3313 | 3131 |
| 1331 | 3311 | 3133 | 1333 | 3112* | 3133 | 1231* |
| 3131 | 3111 | 1113 | 1111 | 3133 | 3111 | 3311 |
| 0131* | 3111 | 2133* | 3133 | 1333 | 1233* | 3133 |
| 1111 | 3211* | 3111 | 3311 | | | |

Table 2. Test data set sort results

FIG. 22
(Input pattern)

```
0000000040000000
0000000040000000
0000000040000000
0000000040000000
0000344464444300
0000400000040000
0000400000040000
0000400000040000
0000400000064444
0000400000040000
0000400000040000
0000400000040000
0000344464444300
0033000000000000
0330000000000000
4300000000000000
0000000000000000
```

FIG. 23
(Output pattern - Amplification x4)

|  | Type B | Type C | Type D | Type E |
|---|---|---|---|---|
|  | 0300 | 0220 | 0000 | 0123 |
|  | 0301 | 0330 |  |  |
|  | 0302 |  |  |  |
|  | 0303 |  |  |  |
|  | 1030 |  |  |  |
|  | 2030 |  |  |  |
|  | 3030 |  |  |  |
| Totals | 8 | 2 | 1 | 1 |

Table 3

| | | | | | | | |
|---|---|---|---|---|---|---|---|
| 0000D* | 0001B | 0002B | 0003B | 0030B* | 0031B | 0032B | 0033B |
| 0123E* | 0220C* | 0230C | 0300B* | 0301B* | 0320B* | 0303B* | 0320C |
| 0330C* | 0331B | 0332B | 0333B | 1000B | 1001B | 1002B | 1003B |
| 1030B* | 1031B | 1032B | 1033B | 1300B | 1301B | 1302B | 1303B |
| 1330B | 1331B | 1332B | 1333B | 2000B | 2001B | 2002B | 2003B |
| 2030B* | 2031B | 2032B | 2033B | 2300B | 2301B | 2302B | 2303B |
| 2330B | 2331B | 2331B | 2333B | 3000B | 3001B | 3002B | 3003B |
| 3030B* | 3031B | 3032B | 3033B | 3300B | 3301B | 3302B | 3303B |
| 3330B | 3331B | 3332B | 3333B |  |  |  |  |

* Actual unacceptable units

Table 4

| | | | | | | | |
|---|---|---|---|---|---|---|---|
| 0000D* | 0001B | 0002B | 0003B | 0030B* | 0123E* | 0220C* | 0230C |
| 0300B* | 0301B* | 0302B* | 0303B* | 0320C | 0330C* | 1000B | 1003B |
| 1030B* | 2000B | 2003B | 2030B* | 3000B | 3001B | 3002B | 3003B |
| 3030B* |  |  |  |  |  |  |  |

* Actual unacceptable units

Table 5

Fig. 21

| TIME | DIAST. | SYST. |
|---|---|---|
| 1 | 61 | 99 |
| 2 | 61 | 99 |
| 3 | 61 | 99 |
| 4 | 60 | 100 |
| 5 | 60 | 99 |
| 6 | 60 | 100 |
| 7 | 60 | 100 |
| 8 | 60 | 100 |
| 9 | 60 | 100 |
| 10 | 60 | 100 |
| 11 | 60 | 100 |
| 12 | 60 | 100 |
| 13 | 60 | 100 |
| 14 | 60 | 100 |
| 15 | 60 | 100 |
| 16 | 60 | 100 |
| 17 | 60 | 100 |
| 18 | 60 | 100 |
| 19 | 60 | 100 |
| 20 | 60 | 100 |
| 21 | 60 | 100 |
| 22 | 60 | 100 |
| 23 | 60 | 100 |
| 24 | 60 | 100 |
| 25 | 60 | 100 |
| 26 | 60 | 100 |
| 27 | 60 | 100 |
| 28 | 60 | 100 |
| 29 | 60 | 100 |
| 30 | 60 | 100 |
| 31 | 60 | 100 |
| 32 | 60 | 100 |
| 33 | 60 | 100 |
| 34 | 60 | 100 |
| 35 | 60 | 100 |
| 36 | 60 | 100 |
| 37 | 60 | 100 |
| 38 | 60 | 100 |
| 39 | 60 | 100 |

INPUT PARAMETERS

| BEATS/MINUTE | 30 |
| MIN. PRESSURE | 60 |
| MAX. PRESSURE | 100 |
| SAMPLE INTERVAL | .01 SEC. |
| EXP. LENGTH | 60 SEC. |

SIMULATED OUTPUT

| TIME | FREQUENCY | X | $X_1$ | $X_2$ |
|---|---|---|---|---|
| 1 | 10000:00000:00000:00000 --- | 1947 | 6 | 5 |
| 2 | 00000:00000:00000:00000 <== | 1938 | -9 | -15 |
| 3 | 00000:00000:00000:00000 | 1930 | -8 | 1 |
| 4 | 00000:00000:00000:00000 | 1926 | -4 | 4 |
| 5 | 40000:00000:00000:00000 | 1937 | 11 | 15 |
| 6 | 40000:00000:00000:00000 <== | 1944 | 7 | -4 |
| 7 | 44000:00044:40330:00000 --- | 1990 | 46 | 39 |
| 8 | 44000:00044:40034:40000 <== | 2025 | 35 | -11 |
| 9 | 44000:00044:40334:30000 | 2028 | 3 | -32 |
| 10 | 44000:00044:00030:00000 | 2027 | -1 | -4 |
| 11 | 44400:00440:00000:00000 | 2027 | 0 | 1 |
| 12 | 34400:04400:00000:00000 --- | 2054 | 27 | 27 |
| 13 | 34400:44000:00000:00000 <== | 2050 | -4 | -31 |
| 14 | 34400:44000:00000:00000 | 2036 | -14 | -10 |
| 15 | 34400:04440:00334:00000 --- | 2052 | 16 | 30 |
| 16 | 44000:00443:00034:30000 | 2074 | 22 | 6 |
| 17 | 44000:00334:40034:30000 <== | 2090 | 16 | -6 |
| 18 | 44000:00034:40334:30000 | 2080 | -10 | -26 |
| 19 | 44400:00004:00334:30000 | 2047 | -33 | -23 |
| 20 | 34400:00444:00334:30000 --- | 2031 | -16 | 17 |
| 21 | 34400:00443:00334:30000 <== | 2012 | -19 | -3 |
| 22 | 34433:44330:00334:00000 --- | 2051 | 39 | 58 |
| 23 | 34433:44440:00000:00000 <== | 2074 | 23 | -16 |
| 24 | 34433:04400:00000:00000 | 2052 | -22 | -45 |
| 25 | 34433:00000:00000:00000 --- | 2047 | -5 | 17 |
| 26 | 34433:33000:00000:00000 <== | 2032 | -15 | -10 |
| 27 | 34433:44000:00000:00000 | 2023 | -9 | 6 |
| 28 | 34433:44000:00000:00000 | 2014 | -9 | 0 |
| 29 | 33440:44000:00000:00000 --- | 2030 | 16 | 25 |
| 30 | 33440:04400:00000:00000 <== | 2039 | 9 | -7 |
| 31 | 33440:04433:00034:40000 --- | 2075 | 36 | 27 |
| 32 | 33330:04433:00034:40000 <== | 2086 | 11 | -25 |
| 33 | 33330:04433:00034:40000 | 2073 | -13 | -24 |
| 34 | 33330:44333:00000:00000 --- | 2074 | 1 | 14 |
| 35 | 33330:44333:00000:00000 <== | 2063 | -11 | -12 |
| 36 | 33330:44000:00000:00000 | 2062 | -1 | 10 |
| 37 | 33000:40000:00000:00000 --- | 2077 | 15 | 16 |
| 38 | 33000:40000:00000:00000 <== | 2058 | -19 | -34 |
| 39 | 33000:00000:00000:00000 | 2043 | -15 | 4 |
| 40 | 33000:00000:00000:00000 | 2030 | -13 | 2 |
| 41 | 33000:00000:00000:00000 | 2020 | -10 | 3 |

FIG. 25

METHOD OF AND APPARATUS FOR PATTERN RECOGNITION

This invention relates to pattern recognition, and more particularly to methods of and apparatus for analysis of patterns, both in static and dynamic modes, and application of such method to the control of processes generally.

Human recognition of patterns in a given data set appears to be quite simple and easy, but duplication of that recognition by a machine, particularly in the field of robotics, can be difficult, inexact, and often impossible within the present state of the art. For example, one may want to have a robot that can select a bolt from a random array of bolts and insert that bolt into a hole in a work piece. To achieve this simple task involves, inter alia, the ability (1) to recognize visually an item identifiable as a bolt regardless of spatial orientation, (2) to segregate that bolt from the set of bolts regardless of the spatial orientation of the members of the set, (3) to determine the spatial location of the identified bolt so that the latter may be seized, (4) to recognize visually the particular hole in the work-piece into which the bolt is to be placed, and (5) to determine the spatial coordinates of the hole so that the bolt may be properly installed.

It will be appreciated that the foregoing description can be simply characterized as an analysis and reconstruction of the sampled operation, the analysis depending upon some capability of recognizing in a set of data those patterns characteristic of bolts and holes. There exists a virtually infinite number of data sets in which patterns can readily be recognized by the human visual mechanism, depending upon the skill, experience and mood of the analyst, but in many cases there appears to be no adequate method to achieve such analysis and reconstruction automatically by machines.

A principal object of the present invention is therefore to provide a pattern recognition system capable of substantially duplicating aspects of human recognition behaviour. Other objects of the present invention are to provide such a recognition system which is computer aided; to provide such a recognition system having the capability of distinguishing a particular species or class from other species, even those quite similar in many respects; and to provide such a recognition system capable of generating output signals for controlling apparatus or processes in accordance with recognition of predetermined patterns.

It will be apparent that the instant invention has wide applications. For example, the recognition system of the present invention is applicable to such diverse procedures as the alignment of an object with respect to some reference direction such as the margin of a printed page in printing operations, or the edge of a workpiece being machine-tooled, or the principal axis of a chromosome as seen through a microscope, and the like. Other typical applications of the present invention are to provide quality control through recognition of undesirable characteristics of units being made on a production line so as to permit such defective units to be segregated or sorted from the others; to identify and locate boundaries between more or less homogenous regions of a pattern such as in image transmission, recognition of logical units of speech, and analysis of geophysical and geological data; and to recognize changes in signal characteristics such as in earthquake and intrusion detection.

Information theory provides a suitable frame of reference for understanding the powerful and versatile pattern recognition system of the present invention. In communications, freedom of choice in selecting a message is closely related to information in that where the freedom of choice is large, so is the information; the more restricted the choice, the smaller the amount of information that is present.

More formally, consider a message source with Q different symbols. If all possible messages are considered, the symbols will appear with the probabilities, $p_1$, $p_2$, $p_3$, ... $p_Q$. In 1948, Shannon, "The Mathematical Theory of Communication", Bell System Technical Journal, 27, pp. 379–423, 623–656, demonstrated that information can be expressed in terms of such probabilities, and it can be shown that the average information H per symbol for that source is $$H = -\sum_{i=1}^{Q} p_i \cdot \log_b(p_i) \tag{1}$$

where
b is the base of the logarithm,
Q is the number of different symbols, and
$p_i$ is the probability of the ith symbol occurring in H.
If b=2, then the average information H, is expressed in binary bits per symbol.

For a long message from the source, which message contains N symbols, the total information I in the message is $$I = N \cdot H = -N \sum_{i=1}^{Q} p_i \cdot \log_b(p_i) \tag{2}$$

The number of occurrences of the ith symbol in the message is $$n_i = N \cdot p_i \tag{3}$$

Using equation (3), equation (2) may be rewritten $$I = -\sum_{i=1}^{Q} n_i \cdot \log_b(p_i) \tag{4}$$

The expression $-\log_b(p_i)$ is an appropriate function for measuring information. If the probability of an event is unity, there is no surprise when the event occurs and no information is communicated. On the other hand, if the probability of an event is low and the event occurs, then there is surprise and considerable information is communicated. The log function exhibits this behaviour since $-\log(1)=0$ and $-\log(0)=\infty$. Also, the log function varies monotonically with p for intermediate values, as required.

It should be noted that equation (1) is in fact also the expression for entropy in statistical mechanics where entropy is related to order. The greater the order is in a system, the lower the entropy, and vice versa. The most ordered states for a message source are those where the probability is unity for one symbol and zero for all others. In such instance, the information per symbol, or the entropy for the message source, is zero. The terms in equation (1) are $(-1.\log(1))$ for the symbol with probability unity and $(-0.\log(0))$ for symbols with probability zero. The apparent anomaly in this latter expression, i.e. $(0.\infty)$, is readily resolved by observing that $$\text{limit } x \cdot \log x = 0 \quad x \to 0 \tag{5}$$

since in the limit, x goes to xero more rapidly than log(x) goes to minus infinity.

Similarly, the message source exhibits greatest disorder and hence highest entropy or information per symbol when all symbol probabilities are maxima. The maximum entropy or information per symbol increases as the number of symbols in the message source increases.

Shannon, supra, also showed that the maximum rate R at which symbols can be transmitted from a message source over a noise-free channel designed for transmission of digital signals, which channel has a capacity of C bits/second, is $$R = C/H \tag{6}$$

Achieving this rate in practise requires selection of an optimum coding scheme for the source. H is thus a measure of the efficiency of the particular coding scheme adopted. This specification of coding efficiency in terms of the entropy or information per symbol is an important measure in communication engineering and will be shown to be of great importance in pattern recognition as well.

If one considers two message sources with symbol probabilities $p_i$ and $p_i'$ respectively, it should be possible to identify the source by using the frequency of occurrence of the symbols in a test message produced by one of these respective sources. If the test message is long enough, then the symbol probabilities will be the same as those for one of the reference message sources, in which case a comparison among the probabilities of the sources and test message provide an unequivocal, straightforward identification. The problem, however, becomes more difficult when the test message is so short that the symbol probability specification may be incomplete, or when using more than two reference message sources. It still is possible to determine which message source the test message most nearly resembles, but exactly how the comparison should be made is more subtle.

There are several important features that a preferred comparison technique should possess. The technique should place heavier weight on symbols that appear frequently in the test message than on those that appear infrequently. It is very significant when a symbol appears in the test message but not in the reference message source, since reference statistics are well defined. In such instance, the comparison should indicate that there is not a good fit. The comparison technique should also be relatively insensitive to the presence of a symbol found in the reference message source but absent or infrequent in a test message, since the test message may be relatively short and exhibit incomplete statistics as above-noted.

These desirable features are provided if the comparison method determines the information required to express the test message in terms of the optimum code for the reference message source. Equation (4) gives the total information for a message containing N symbols. The information contribution for the ith symbol is $n_i \cdot \log_b(p_i)$, where $n_i$ is the number of occurrences of the ith symbol in the message and $p_i$ is the probability of occurrence of the ith symbol as determined for the message source. The term $\log(p_i)$ is in effect the information contribution per occurrence for the ith symbol using the optimum code for the source.

By analogy, the information for a test message T, expressed in terms of the optimum code for a reference message source R, is given by $$I(T:R) = -\sum_{i=1}^{Q} m_i \cdot \log_b \cdot (p_i) \tag{6}$$

where $m_i$ is the number of occurrences of the ith symbol in the test message, and $p_i$ is the probability for the ith symbol for the reference message source.

When information is expressed using b=2, then I(T:R), the information of T on R, is the number of binary bits required to express the T message in the R code, i.e. the information of T expressed in terms of R.

Similarly, the entropy of a test message expressed in terms of the reference optimum code is $$H(T:R) = -\frac{1}{M} \sum_{i=1}^{Q} m_i \cdot \log_b(p_i) \tag{7}$$

M being the number of symbols in T as follows:

$$M = \sum_{i=1}^{Q} m_i \tag{8}$$

It will be seen that equations (6) and (7) contain terms of the form $m_i \log(p_i)$ and thus give greater weight to test message symbols occuring frequently than to those occuring infrequently. While both of these equations meet the conditions above specified as necessary for making numeric comparisons among the test and reference source messages; there are circumstances where neither of the functions I(T:R) or H(T:R) if used alone is well suited for this purpose. For example, one can define two histograms which have identical probabilities as being similar (in the geometric sense). When T is similar to R, H(T:R) will equal H(R:R), the number of bits per symbol in the optimum code for R. When T is not similar to R, the value of H(T:R) can be larger or smaller than H(R:R) depending upon the relative frequency of occurrence of the symbols in the test message and the reference message. Such behaviour may make comparison difficult. Thus, a more suitable expression is $$D_1 = H(T:R) - H(T:T) \tag{9}$$

where H(T:T) is the average number of bits per symbol in the optimum code for T. When T is similar to R, equation (9) is identically zero. When T is not similar to R, then equation (6) is greater than zero, and the smaller the value of the entropy difference D, the greater is the similarity of the test and reference messages.

The expression $$D_2 = I(T:R) - I(T:T) \tag{10}$$

is also useful in making comparisons, it being recognized that equation (10) is an expression of the total information difference rather than the average information difference per symbol.

Equations (9) and (10) are general expressions each of which respectively may be divided into two classes:

(1) Determine which test object $T_n$ of a group of n test objects is most similar to a specified reference R, by finding that value of n which minimizes $$H(T_n:R) - H(T_n:T_n) \qquad (9.1)$$

(2) Determine to which reference $R_n$ of a group of n references, a test object T is most similar, as by finding that value of n which minimizes $$H(T:R_n) - H(T:T) \qquad (9.2)$$

Clearly, a similar two classes can be derived from equation (10). In either event, the class of problems set forth in expressions such as (9.2) requires less computation than does that set forth in expression (9.1) because the second term in (9.2), being independent of n, need not be calculated.

Additionally, other differences expressed as follows, will also prove to be useful as comparisons in pattern recognition applications within the scope of the present invention:

$$D_3 = H(T:R) - H(R:R) \text{ and} \qquad (11)$$

$$D_4 = I(T:R) - I(R:R) \qquad (12)$$

The formalisms expressed in the equations adduced thus far are useful in the present invention in machine recognition of patterns of the type that humans recognize easily. The related but different problem of recognizing patterns that are hidden or difficult to discern is considered secondary to purposes of this invention.

The foregoing and other objects to achieve the pattern recognition of the present invention are realized by first determining a number of prespecified distinguishing physical characteristics or parameters generating a set of signals based upon an idealized representation of the reference pattern. The same distinguishing physical characteristics are then sought in an embodiment under test for recognition of the pattern of interest. Where the test and reference data are derived in quantized form as digital signals, they may be stored or recorded directly; when derived as analog signals, they are preferably converted to digital form for storage and comparison. This is true for time series data as well as for data derived from images.

As will become more apparent when specific examples are presented hereinafter, it is preferred to organize these data as histograms, i.e. as used herein, intended to include broadly arrays of discrete elements in terms of frequency distribution vs. class interval or range, not necessarily normalized. Fortunately, digital data representing pattern features are well suited for use with histograms. For example, in image analysis, pattern feature information can often be represented by pixel counts such as the number of pixels in a specific color or intensity range, or the number of edge pixels in a particular slope range, or the number of pixels along a feature boundary. It is a simple matter to collect counts of a like character in histograms cells during the measurement process.

It will be seen that such histograms are related to the test message and reference message source discussed earlier. Each cell in a histogram can be considered equivalent to a message symbol, and the number of counts in the histogram cell is then equivalent to the number of occurrences of the symbol in the message. The histograms respectively representing the reference data and the test data are then compared numerically using the mathematical relations previously described herein to determine the degree of histogram similarity. Thus, the comparison of histograms or frequency distributions is accomplished by determining the value of a function which provides a measure of the information necessary to express a message with symbols identified with (a) particular class intervals of ranges, and (b) an expression of the number of occurrences of such symbols. The comparison can be used to provide a numerical measure of similarities of the pattern of interest in the embodiment under test to the reference pattern. That numerical measure preferably is employed to generate a corresponding output signal which may be used for control purposes whether the application of the method of the present invention is in such diverse fields as robotics, speech recognition, image analysis or the like.

It must be noted that while communications engineering is concerned with transmission properties rather than the content of messages, the situation is not quite as simple in pattern recognition according to the principles of the present invention. Effectiveness in comparing the test and reference pattern features depends on the skill with which feature selection and physical measurements are made, and on the characteristics of the reference data base. Each of these relates to internal message content even though the comparison itself deals formally only with external characteristics of information.

Other objects of the invention will in part be obvious and will in part appear hereinafter. The invention accordingly comprises the apparatus possessing the construction, combination of elements and arrangement of parts, and the processes involving the several steps and the relation and order of one or more of such steps, all of which are exemplified in the following detailed disclosure, and the scope of the application of which will be indicated in the claims.

For a fuller understanding of the nature and objects of the present invention, reference should be had to the following detailed description taken in connection with the accompanying drawings wherein:

FIG. 1A is a line drawing of a geometrical form, the pattern characteristics of which are to be determined;

FIG. 1B is a digital map of the form of FIG. 1A as provided by a scanner;

FIG. 1C illustrates the determination of slope from a digital map such as that of FIG. 1B;

FIG. 7 is a table of the results of comparisons of 5 functions of histograms of FIGS. 4–6;

FIG. 8 is a closed test triangle and related edge-slope histograms;

FIG. 9 is a open test triangle and related edge-slope histograms;

FIG. 10 is a rounded test triangle and related edge-slope histograms;

FIG. 11 is a chart of the results of comparisons of functions of the histograms of FIGS. 8–10;

FIG. 17 is a chart of the results of comparisons of a function of the histograms of FIGS. 12–16;

FIG. 18 is a chart of the results of comparisons of another function of the histograms of FIGS. 12–16;

FIG. 20 is a reference data set and a test data set exemplary of a sorting method of the present invention;

FIG. 21 shows two tables of results of the sorting method described in connection with FIG. 20;

FIG. 22 is a pattern in which boundaries are to be located using the principles of the present invention;

FIG. 23 shows an output pattern indicating boundary identification in the pattern of FIG. 22;

FIG. 25 is a partial output from an acoustic pattern segmentation analysis by the method of the present invention.

The earlier of the following paragraphs will generally describe how pattern features can be defined and then described in terms of a set of physical measurements, how the measurements can be organized as histograms and lastly how pattern features can be compared using these histograms and the mathematical relations developed hereinbefore.

In the simple line drawing shown in FIG. 1A, the boundaries and interior of a triangle are shaded, the background field being white. The triangle's three sides of characteristic length and slope and three apices with specific included angle, and the distribution of shaded and white areas within the entire field, are all features or physical attributes that can be measured.

The information within the field of view of FIG. 1A can be converted to digital form by any of a number of known optical scanners. The latter assign a number corresponding to a particular gray scale, to each picture element (pixel) as shown in FIG. 1B, an essentially binary image since only shaded and unshaded areas are represented respectively by the values 1 and 0. The shaded and unshaded areas can be measured simply by counting the total number of 1s and 0s. The same general approach can be used to measure other pattern properties.

The slope of an object edge element can be measured by counting the number of pixels in the x and y directions along the straight edge of an edge step. The slope of the step, shown as a broken line in FIG. 1C, is given by $n_y:n_x$ where the signs of x and y must also be considered. The sign convention is as if the figure edges were traced in a counterclockwise direction. Only certain $n_x$, $n_y$ combinations are permitted. Specifically if $n_x=m$ then $n_y=0\pm 1$; and if $n_y=m$, then $n_x=0\pm 1$. Without such restrictions an edge shaped like a flight of stairs would be represented by a line having the slope of the staircase rather than the individual straight line elements actually making up the staircase.

The length of the same line edge is given by $$C_{xy}=(n_x^2+n_y^2)^{\frac{1}{2}} \qquad (13)$$

The term $C_{xy}$ thus measures the number of pixels along the slope. The length of a triangle side can be determined by adding all of the $C_{xy}$ values for the steps along the side of interest. Thus, areas, slopes, lengths and other pattern properties of interest can be determined by simple counting operations. Such data lend themselves to histographic representation since relatively large numbers of counts and a relatively few event classes are involved. The event classes, of course, correspond to histogram cells.

One important class of organizational schemes, referred to herein as mapping, is where each point in an image is identified with a specific set of histogram cells, the particular member of the set depending on the value at that point.

Figure 2A:
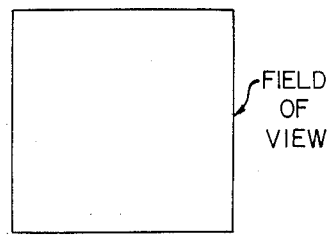
FIG. 2A is a field of view used for scanning an object to create a value-only histogram.
Figure 2B:
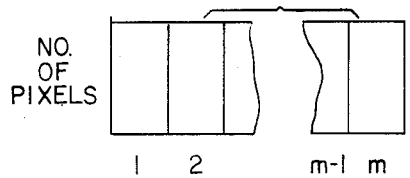
FIG. 2B is a simplified histogram derived from the scanning of the field of view of FIG. 2A, and described herein as a value-only histogram.

A simplified histogram, shown in FIG. 2B, will be referred to hereinafter as the value-only histogram. This histogram comprises a number of cells each representing a different class or range of events or property, each storing simply a count of pixels into which the field of view of FIG. 2A is preferably divided. One important application of many is the representation of color-area or intensity-area information. In the latter application, each value designated as 0, 1, 2, . . .n represents a particular intensity range. The field of view of interest is scanned as above described and each pixel counted in the appropriate histogram cell. This mapping can be readily implemented by incrementing digital counters, one for each cell of the histogram, until the entire field of view has been scanned. The final count in each counter is then a function of the size of the field of view and the intensity pattern or distribution in that field. Note that the histogram cell count is independent of orientation or shape of objects within the field of view.

The value-only histogram, as will be apparent later herein, can be used in the present invention to search, locate and often finally identify, patterns, and such use is not limited to applications involving two-dimensional images.

Figure 2C:
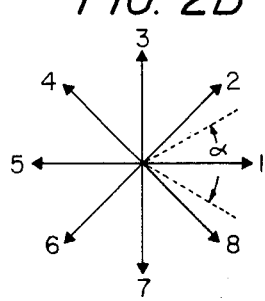
FIG. 2C is a diagram of vector ranges into which data can be divided to obtain a slope-edge histogram of the present invention.

A second type of histogram, referred to herein as the edge-slope histogram, is very useful in making pattern comparisons that depend upon object shape. This histogram, a simple version of which is similar to that shown in FIG. 2B, but differs however in that the count in each cell is not the number of pixels in the field of view of FIG. 2C, but the effective number of edge pixels in a given slope range. For example, the edge-step histogram is formed by the same technique of scanning and converting the data to digital form mapped typically into a binary map. From the mapped data, edge-step slopes are determined from the $n_y$ and $n_x$ values for each individual step as it is encountered, and the counters corresponding to the appropriate histogram cells for selected ranges of those values of $n_y/n_x$ are then incremented accordingly. Typically, as shown in FIG. 2C, a two-dimensional field being scanned is arbitrarily divided into a number, e.g. 8, of sectors, and each cell of the histogram then corresponds to one of the slope vector ranges. For example, slope vector 1 includes all edge elements having slopes falling within the pie-shaped range about vector 1 as defined by the broken lines in FIG. 2C. It will be seen that the edge-slope histogram contains information that depends upon the composition and orientation of objects within the field of view, but not their specific location.

The mapping of data to the edge-slope histogram does not require that the edges scanned be continuous or even belong to a single object. The scanned object may have corners, inflection points, reentrant shapes, or even discontinuities such as missing edges caused for example by poor illumination, diffraction effects and the like. The results of subsequent comparison of test and reference edge-slope histograms however will obviously be influenced by such factors, but nevertheless the results of such comparison will generally be useful provided the image degradation problems are not too severe.

Figure 3A:
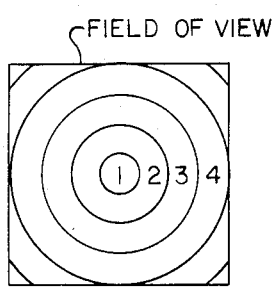
FIG. 3A is a field of view divided to obtain ring mapping.
Figure 3B:
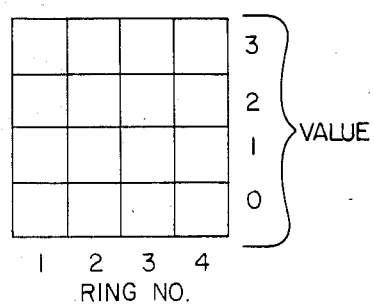
FIG. 3B is a simplified generalized ring histogram corresponding to the field of view of FIG. 3A.

Other mapping techniques fall within the ambit of the present invention. For example, a mapping in which all points lying at the same distance from the center of the scan window are associated with the same set of histogram cells, will tend to decrease the amount of information necessary to describe objects having a substantial degree of circular symmetry. Such mapping, referred to here as ring mapping, may be visualized as projection of a field of view, divided as shown in FIG. 3A, into sets of histograms arrayed along a radius. The histogram for ring mapping, as shown in FIG. 3B, may be regarded as having two dimensions, position and value. The position is given by the integer value of the distance of the pixel from the center of the window divided by the cell size, typically one pixel. The position in this two-dimensional histogram is then assigned on the basis of the two coordinates. The method of computation of the various information and entropy functions of the resulting histogram remain unchanged from the previously described histograms.

The major importance of ring mapping is its ability to discriminate on the basis of orientation-independent spatial features. Its usefulness is not limited to locating objects having circular symmetry. Since some degree of circular symmetry can be imparted to the image of almost any object simply by centering the window on the center of the object, ring mapping is worth considering in any situation requiring accurate location of objects, particularly those whose orientation is unknown.

Figure 3C:
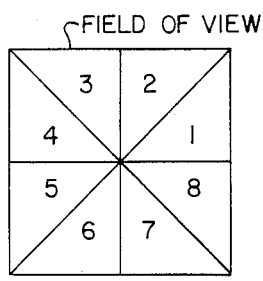
FIG. 3C is a field of view divided to obtain pi mapping.
Figure 3D:
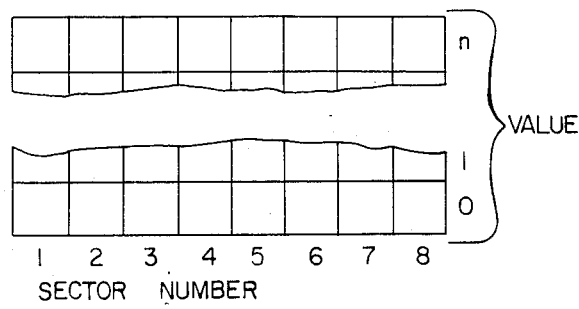
FIG. 3D is a simplified generalized pi histogram corresponding to the field of view of FIG. 3C.

Another important mapping is one by which all points lying along the same radius from the center are associated with the same set of histogram cells. This mapping will facilitate description of patterns in which angles are important, and may be visualized as a projection of the field of view divided as shown in FIG. 3C, onto sets of histograms arrayed around the circumference of the window. Such mapping, referred to as pi mapping, is useful with objects having characteristic radial features to determine orientation and for identification. The histogram for pi mapping, shown in FIG. 3D, may also be regarded as having two dimensions: angle or sector, and value.

Other mappings of interest are linear mappings in which all projections are parallel to a specific direction, i.e. the field of view is divided into a regular array of rectangular sections. Two important such linear mappings, vertical (onto the x-axis) and horizontal (onto the y-axis), particularly facilitate description of images containing parallel lineations. Here the histograms are again two-dimensional as in FIG. 3B, except that the axes are identified as involving position along the desired axis and value.

Figure 4:
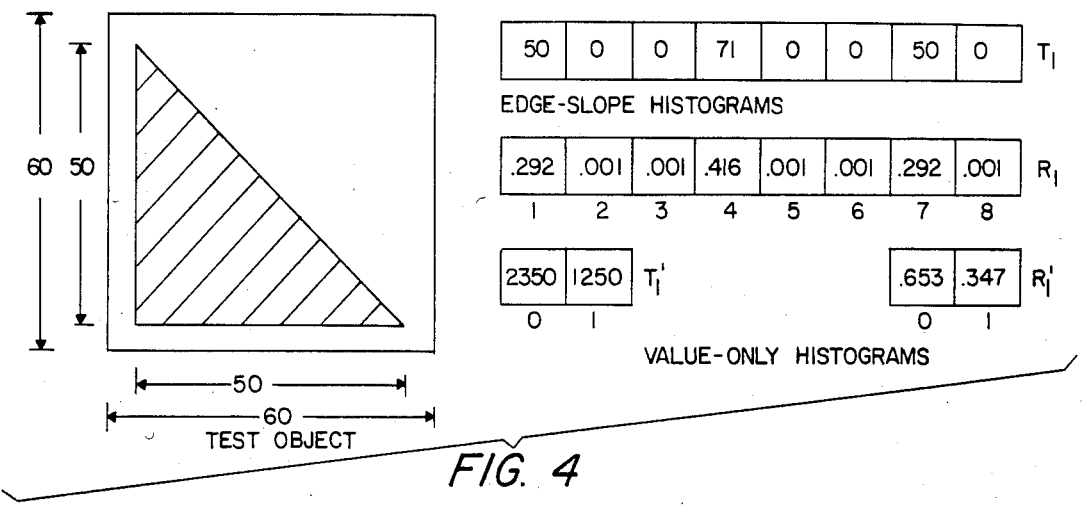
FIG. 4 is a field of view containing a first test triangle, and accompanied by a number of histograms relating thereto.
Figure 5:
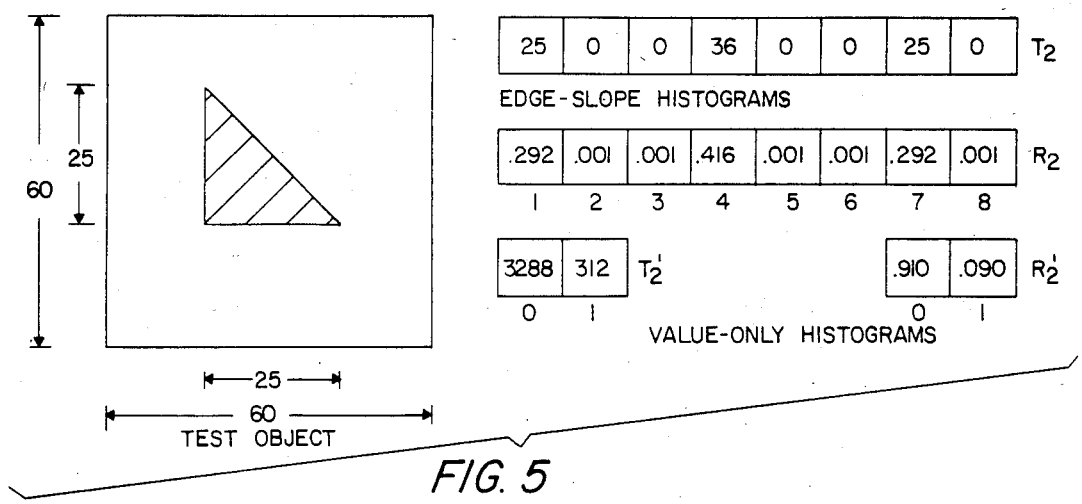
FIG. 5 is a field of view containing a second test triangle, and related histograms.
Figure 6:
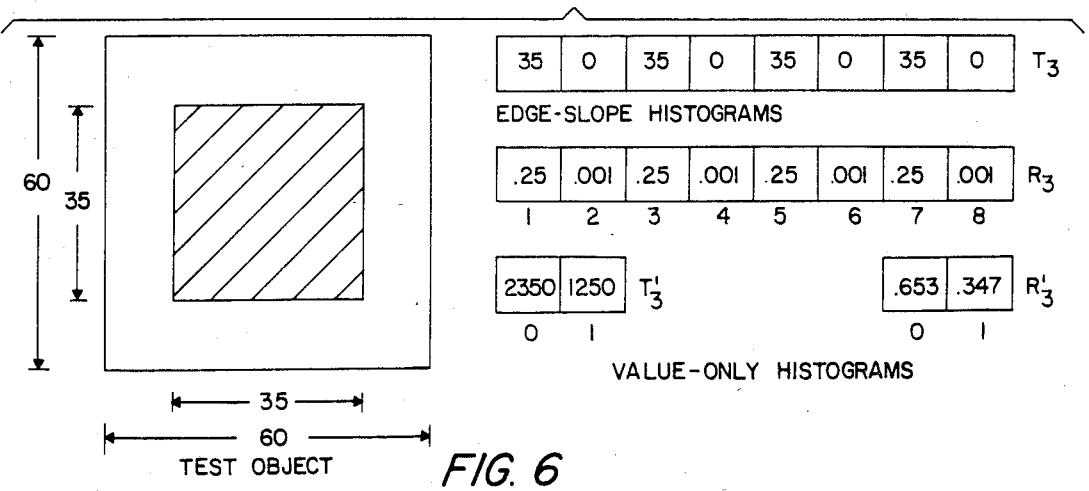
FIG. 6 is a field of view containing a test square, and a number of related histograms.
Figure 12:
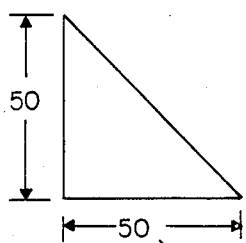
FIG. 12 is a test triangle and related edge-slope histograms.
Figure 13:
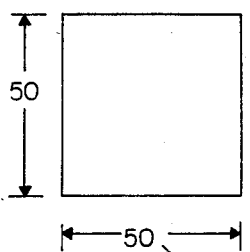
FIG. 13 is a test square and related edge-slope histograms.
Figure 14:
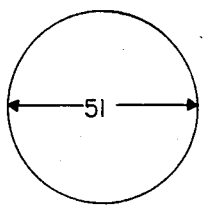
FIG. 14 is a test circle and related edge-slope histograms.
Figure 15:
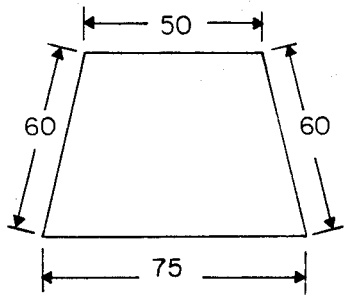
FIG. 15 is a test trapezoid and related edge-slope histograms.
Figure 16:
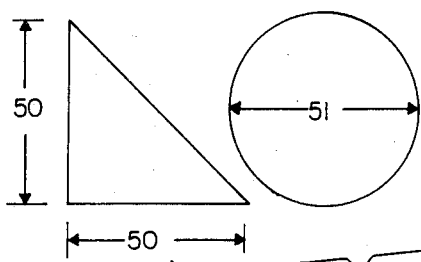
FIG. 16 is a test triangle-and-circle and related edge-slope histograms.

A simplified explanation of how the histograms are employed in the process of the present invention in recognizing simple shapes and their sizes, is believed to be useful in understanding the present invention. To this end, a number of simple geometric shapes, in the form of shaded images on a white background are shown in FIGS. 4 to 6 inclusive and 8 to 10 inclusive. A test and a reference edge-slope histogram, and a test and reference value-only histogram are shown in each Figure for each geometrical object. Binary images have been used to simplify computations of the histograms and comparisons, but color or gray scale information could have been included by adding cells for color or intensity information to the value-only histograms.

The test edge-slope histograms in FIGS. 4-6 and 8-10 were constructed by mapping edge lengths shown in the test objects into appropriate histogram cells as pixel counts. Values for the edge-slope reference histograms were produced as a percentage of the frequency of occurrence from these counts. Cells in the reference edge-slope histograms corresponding to cells containing a zero count in the test edge-slope histograms, were seeded with a value 0.001. This has several desirable effects. If $m_i$ and $p_i$ are both zero, use of the seed produces the correct result while avoiding the difficulties associated with evaluating $m_i \log(p_i)$. If $m_i > 0$ and $p_i = 0$, use of the seed results in a large but finite value of $I(T:R)$ which is proportional to the total number of mismatches (symbols which occur in T but not in R). It is precisely this feature which provides the sensitivity to symbols occuring in the test but not the reference which was listed above as an important requirement of a preferred comparison technique. Finally seeding recognizes the fact that the reference probabilities derived from measurements are simply estimates of the true probability of occurrence and that adjustments of the reference histogram to produce a desired outcome are an integral part of the method. Note that the accuracy of the comparison is not influenced by the choice of seed value provided that it is small.

In FIGS. 4-6, the test and reference value-only histograms for each shape were produced by using the black and white area information from the Figures. The field of view dimensions are $60 \times 60$ pixels. The triangle and square dimensions shown are in pixel widths. In the value-only test histogram cell in each of FIGS. 4-6, cell 0 counts white areas and cell 1 shaded areas. The value-only reference histograms were normalized by dividing by the total number of pixels in the field of view, i.e. 3600.

All three test edge-slope histograms, $T_1$, $T_2$ and $T_3$, shown in FIGS. 4-6 are different since the three test objects differ either in shape or size. The edge-slope reference histograms, $R_1$ and $R_2$ for the two triangles are identical since the large and small triangles have the same shape. The optimum code or reference histogram $R_3$ for the square is different since its shape is different.

Because the value-only histograms express size information, the reference value-only histograms, $R_1'$ and $R_2$, for the two triangles differ. However, the value-only reference histograms, $R_1'$ and $R_3$, for the large triangle and the square respectively are the same since the areas are the same.

Patterns are here compared by use of equations (9) and (10). Recall that $I(T:R)$ is the total number of bits required to express the T message in the R code and $H(T:R)$ is the number of bits per symbol required to express T in the R code. Since no code for T can be more efficient than the T optimum code, the two expressions equal zero when T is similar to R and are positive and non-zero when T is not similar to R. The larger the information or entropy difference the greater the dissimilarity between T and R, so a step in the present process is to compare the values generated by determining the entropy or information difference and select the smallest value as indicative of the closest match of test to reference. It is important to note that small differences may be significant when considering entropy $D_1$, i.e. $H(T:R)-H(T:T)$, because the entropy difference is the information per symbol.

The table shown in FIG. 7 lists values of the two difference functions determined by using the histograms from FIGS. 4-6. Comparisons were made for large triangle on large triangle, small triangle on large triangle, large triangle on small triangle, square on triangle and square on square. Both the edge slope and the value only histograms were used. For triangle on triangle and square on square, information and entropy differences are identically zero for both the edge-slope and value-only histograms since test and reference objects have the same shape and size. For small triangle on large triangle or the converse where shape is the same, only edge-slope comparisons are zero. For square on large triangle where area is the same, only the value-only comparison is zero.

Note that the edge-slope entropy $H(T:R)$ equals 1.56 for all triangle on triangle comparisons and the information $I(T:R)$ equals 134 for the small triangle and 268 for the large triangle since the perimeter of the large triangle is twice the length of the small triangle perimeter. The value-only entropy for the small triangle on larger triangle comparison is 0.70 compared to 0.93 for the large triangle on large triangle and 1.29 for the large triangle on small triangle. This is because the histogram for the small triangle exhibits more order than the histogram for the large triangle. The entropy or total information for a more ordered histogram (and hence histogram with a narrower distribution) on a wider, less ordered (but overlapping) histogram is smaller than for the converse case and often also smaller than for the wide distribution on itself. It is this behavior that makes entropy or information alone difficult to use in making comparisons. The information or entropy differences, however, are well behaved as shown in the FIG. 7.

Consider next the geometrical shapes and associated histograms shown in FIGS. 8-10 inclusive. The closed triangle in FIG. 8 is the same as is shown in FIG. 4. The open triangle shown in FIG. 9 was formed simply by removing the corners of the closed triangle. The rounded triangle shown in FIG. 10 was made by closing the open corners of the open triangle of FIG. 9 with segments of a circle.

Values of entropy difference $H(T:R)-H(T:T)$ calculated using the histograms are shown in the table in FIG. 11. The comparisons indicate that the closed triangle and open triangle are very closely related. This is as it should be since a triangle very similar to the closed triangle can be formed by pushing the sides of the open triangle together. The normalized slope components for the two are approximately the same as is shown by the reference histograms. The closed triangle (and open triangle) on rounded triangle comparisons also show great though somewhat less similarity than for the previous case. The comparison of rounded triangle on closed triangle or on open triangle shows greater difference as it should since the rounded triangle contains slope components not present for the other two shapes. The results in FIG. 11 show that the information theoretic comparison meets all of the preconditions established in the initial discussion as being important in the situations illustrated in FIGS. 8-10.

The comparisons made thus far have not taken object orientation into account. Orientation will not influence comparisons made with the value only histogram since only the number of shaded and white pixels and not their location or orientation within the field of view is important. The edge-slope histogram, however, is obviously sensitive to changes in object orientation.

Orientation effects were considered in comparing the objects shown in FIGS. 12 to 16 inclusive. This was done by rotating each object through 360 degrees in 45 degree steps and constructing a new histogram for each of the eight positions. Each cell of the histogram includes a slope range of 45 degrees. Consequently, a new histogram corresponding to a 45 degree counterclockwise rotation is produced simply by shifting cell designator numbers one cell to the left. The cell designator number dropping off at the left reappears at the extreme right of the histogram. Each test histogram is then compared with the set of eight reference histograms for a particular shape and hence with all eight orientations of the reference object.

Results of the comparison are summarized in FIG. 17 which sets out entropy differences $H(T:R)-H(T:T)$, and in FIG. 18 which delineates information differences $I(T:R)-I(T:T)$. Only the smallest difference values for the eight reference orientations are tabulated.

Figure 19:
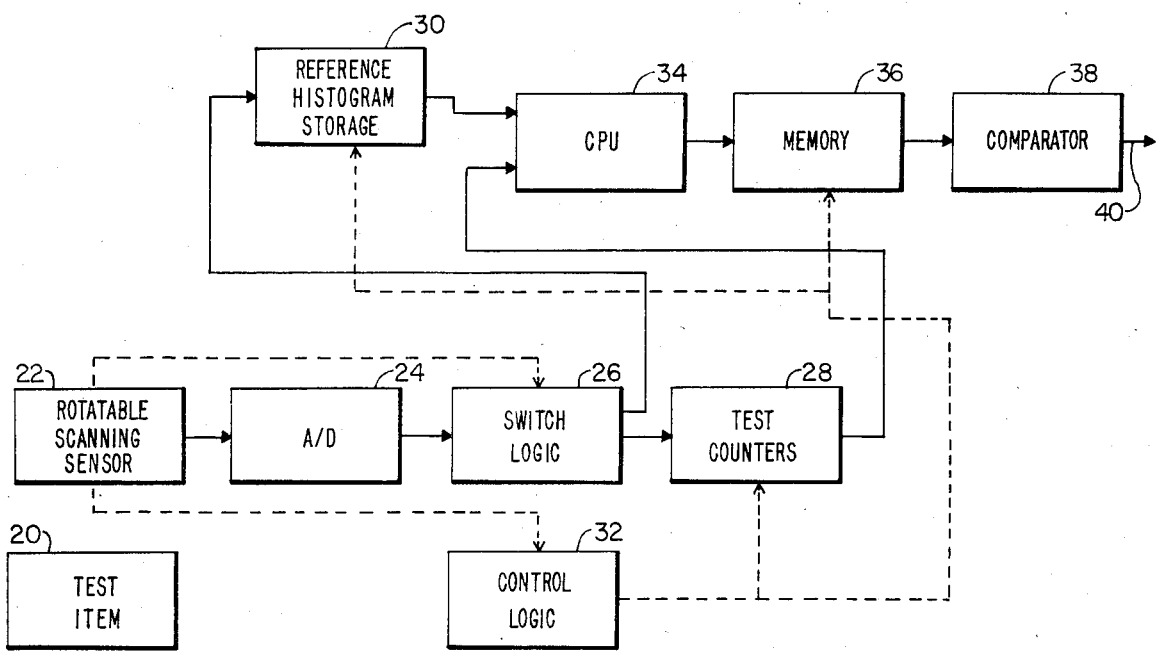
FIG. 19 is a block diagram of exemplary apparatus of the present invention.

Apparatus for carrying out the process of the present invention is shown in FIG. 19 wherein item 20 is under test for a pattern to be recognized therein. In the Figure, data signal paths are shown as solid lines while control signal paths are shown as broken lines. The system shown in FIG. 19 includes means, such as sensor 22, for measuring the values of predetermined pattern parameters in item 20. While such parameters may be electrical, mechanical, optical and the like, for purposes of this exposition sensor 22 will be described as an electrooptical system such as a known video camera system which scans a field of view and generates quantized or digital signals each corresponding to some level of observed light intensity from a corresponding area or discrete object point (pixel) in item 20. Preferably, sensor 22 is mounted so as to be rotatable about the optical axis of its optical system so that scanning can occur along angular segments as heretofore described in connection with FIG. 3. Alternatively, sensor 20 can be fixably mounted while item 20 is supported on a rotatable mounting. In either case, sensor 22 and item 20 are relatively rotatable with respect to one another.

In the event that sensor 20 is simply a scanning system which produced analog signals, the device of FIG. 19 should include an analog to digital convertor 24 for quantizing the output data from sensor 22. In either case, the quantized or digital data is fed into switching logic 26. The latter simply serves to switch the incoming data signals to the proper histogram cell or counter in test counter array 28, in accordance with some function preselected by the operator of the system. In a simple example, a control signal can be produced by an appropriate angle-sensitive generator coupled to the mounting of sensor 22 to indicate in what particular angular segment the camera is scanning. That control signal is then used to select the counter in test counter array 28 corresponding to that particular angular segment so that the proper counter will be incremented by the quantized signals fed into logic 26 at that point in time.

It will be appreciated that sensor 22, convertor 24 and logic 26 may also serve to load another signal counter array shown as reference histogram storage 30. As heretofore noted, a practical reference histogram can be produced by making measurements on a large number of test items and normalizing the results if desired. It is important to note that the histograms per se are seldom actually normalized. When making a comparison, it is desired to look for a particular value such as a minimum or maximum, or to determine that a particular value is greater or lesser than a predetermined value; in any of these cases a normalized histogram is usually not required. If for some reason normalization is required, then it is easier to normalize by calculation than by working on the histogram itself. Consequently, in one form of the apparatus of the present invention, all of the signals which are respectively stored in the various counters of test counter 28 are similarly stored in corresponding counters in storage 30, so that storage 30 accumulates a count each time another test item 20 is scanned.

Means (not shown) are preferably provided in storage 30 for normalizing the count in the counters if desired. Alternatively, storage 30 may simply be a form of memory in which the desired comparison or reference histogram is stored, for example on magnetic tape or in a random access memory, after the histogram has been derived in any desired fashion.

The apparatus of FIG. 19 is preferably controlled by logic 32 so that after the scanning operation of test item 20 is completed, logic 32 instructs array 28 and storage 30 to read out corresponding counters and provide the signals as respective inputs to processing unit 34. The latter typically can be a microprocessor, mini-computer or the like which is programmed to calculate at least a selected one of the functions heretofore described in equations 9, 10, 11 or 12 or others, depending upon the particular results desired. The result of the computation by processor 34 of the selected function with respect to each set of pairs of outputs from a test counter and the corresponding reference counter is then stored in memory 36.

Lastly, the system preferably includes comparator 38 in which a predetermined value of the function of interest has been stored. Comparator 38, Y being connected to the output of memory 36 in response to a command from logic 32, (or even being part of the memory in some cases) then compares the value of the function stored in memory 36 with the preset value. Typically, if the computed value of the function is some minimum value below the preset value, representing for example a least amount of information or degree of disorder and thereby indicating that the desired pattern has been recognized, then comparator 38 provides an output signal at terminal 40 which signal may be used for process control or the like.

A typical application of the system described in FIG. 19 is that of determining whether an item is properly aligned with respect to some prescribed direction. The reference direction on the item might be an easily identifiable characteristic such as the margin on a printed page, an edge or line on an object being manufactured, a natural linear boundary appearing on a satellite image or some principal axis of a system generally.

The alignment problem can be clearly demonstrated for a printed page. The simplest case is where the orientation of a clearly defined element such as a straight, horizontal line of printed characters is determined with respect to a straight reference direction such as the edge of the paper. A more impressive example is where the normal vertical alignment of the characters themselves is used. Here for any system to be successful it must be able to deal with such problems as indentation, non-marginal alignments including chance alignments in the text, and legitimate characters beyond the margin.

The relevant attributes or parameters are the spatial coordinates of characters on the page and some measure related to the visible characteristics of the print such as average reflectivity. For example, lower case letters can be equated with the attribute of light color, upper case letters and numbers with the attribute of dark color and spaces with the attribute of no color. Allowing for three color attributes and 96 position attributes corresponding to 96 allowed character positions across a page, then it is appropriate to map into a 3×96 element accumulator array. A vertical scan of a properly aligned page will result in a relatively high degree of order in those histogram cells associated with the left margins or justification axis (and the right margins if the page is right justified). A skewed page will result in a higher degree of disorder.

The discrete numerical data in this implementation of the method are data triplets, each having the attributes of horizontal position, vertical position and "darkness". Vertical position is the line number measured from the top of the page, horizontal position is one of 80 character positions measured from the left of the page and darkness is one of three values corresponding to the color attributes of blank, light and dark.

Three histograms corresponding to the possibilities that the printing is skewed counterclockwise, unskewed or skewed clockwise are preselected and zeroed. Each histogram has 288 cells in the form of a 3×96 array corresponding to the three darkness attributes and 96 horizontal position attributes. The number of horizontal position attributes is increased in the histogram to allow for the effects of the skew compensation imposed by the mapping function.

A predefined function is used to assign any given data triplet to each of the three histograms in turn according to the relationship:

$$i = d + 3(h + 7 + (j-2)sl) \qquad (14)$$

where
  i is an integer representing the index of the cell to be incremented (If i falls outside the prescribed limits the histogram is not incremented for this data triplet);

d is the darkness value;

h is the horizontal position on the page with respect to a line parallel to the left edge;

j is the histogram index 1, 2, or 3 corresponding to the histograms for which corrections have been applied to the data for left (counterclockwise) skewing, no skewing, or clockwise (right) skewing respectively;

l is vertical position on the page measured in line heights from the top; and s is a skew compensation factor which is equal to twice the skew tolerance per line on the page.

Each data triplet representing the darkness as a function of position on the page, is read in and assigned a location in each of the three histograms according to preselected function (14). Each assigned location or counter is then incremented by one and the operation is repeated until the entire page has been scanned.

The function $$H(R_j : R_j) = I(R_j : R_j)/N(R_j) \tag{15}$$

where $R_j$ refers to the jth histogram;

$$N(R_j) = \sum_{i=1}^{Q} n_{ij} \tag{16}$$

and $n_{ij}$ is the frequency of occurrence indicated by the ith cell in the jth histogram, is then evaluated for each of the three histograms. That value of j for which the function $H(R_j : R_j)$ is smallest, is the value for which the skew correction is judged to have been closest to the correction necessary to align the page. If the value is smallest for j=1, this indicates that correction for a skew is closer to twice the tolerance than it is to zero; therefore it is greater than the tolerance. Similarly, if the value is smallest for j=3, then the printing may be assumed to be skewed right by more than the tolerance; if the value is smallest for j=2, then any skew of the printing is assumed to be within the tolerance. An electrical signal indicating which value of j corresponds to the smallest value of the function can be used to control rejection of the page.

Another application of the system described is that of automatically sorting objects into specified categories, and is most easily demonstrated by the very simple situation in which there are only two categories, acceptable and unacceptable. For the sake of illustration, consider a typical manufacturing process such as the manufacture of bottles where after a short production run for a given type of bottle, the molds are changed and a new type of bottle is produced. Automatic sensing devices are available to monitor the characteristics of the units during production and reject those whose characteristics fall outside prescribed limits. The characteristics of each type of bottle are so different that setting the limits is a relatively complicated task requiring special skills. The important characteristics of this problem generally are (1) the range of attributes of acceptable units is much narrower than the range for unacceptable units, and (2) the penalty for accepting an unacceptable unit is very high compared with the penalty for rejected an acceptable unit.

The present invention makes it quite straightforward to implement a system which, after looking at the characteristics of the members of a training or reference set (each unit of which has been identified as being either acceptable or unacceptable), can then automatically make a decision regarding as to which category an unknown unit should be assigned.

As a simulation of an application of the method of the present invention, a model was selected in which each unit was represented by a "frame" of 4 separate value vs position attributes. Each of these attributes assumed values in the range 0 to 3.

EXAMPLE 1

A reference set and a test set each containing 32 data frames were chosen as follows: attributes were first selected from a random number table accepting only the values 3 and 1, and the resulting four figure numbers were placed into the 32 data frames of each set. "Imperfections" were introduced into each set by using a random number table to choose the locations to substitute 0 and/or 2 into 8 different frames of each set of 32. Those members of the reference set which contained neither 0 nor 2 were labeled as being type "G" (good); all others were labeled "B" (bad). The members of the test set were not labeled.

Figures 20, 22, 23:
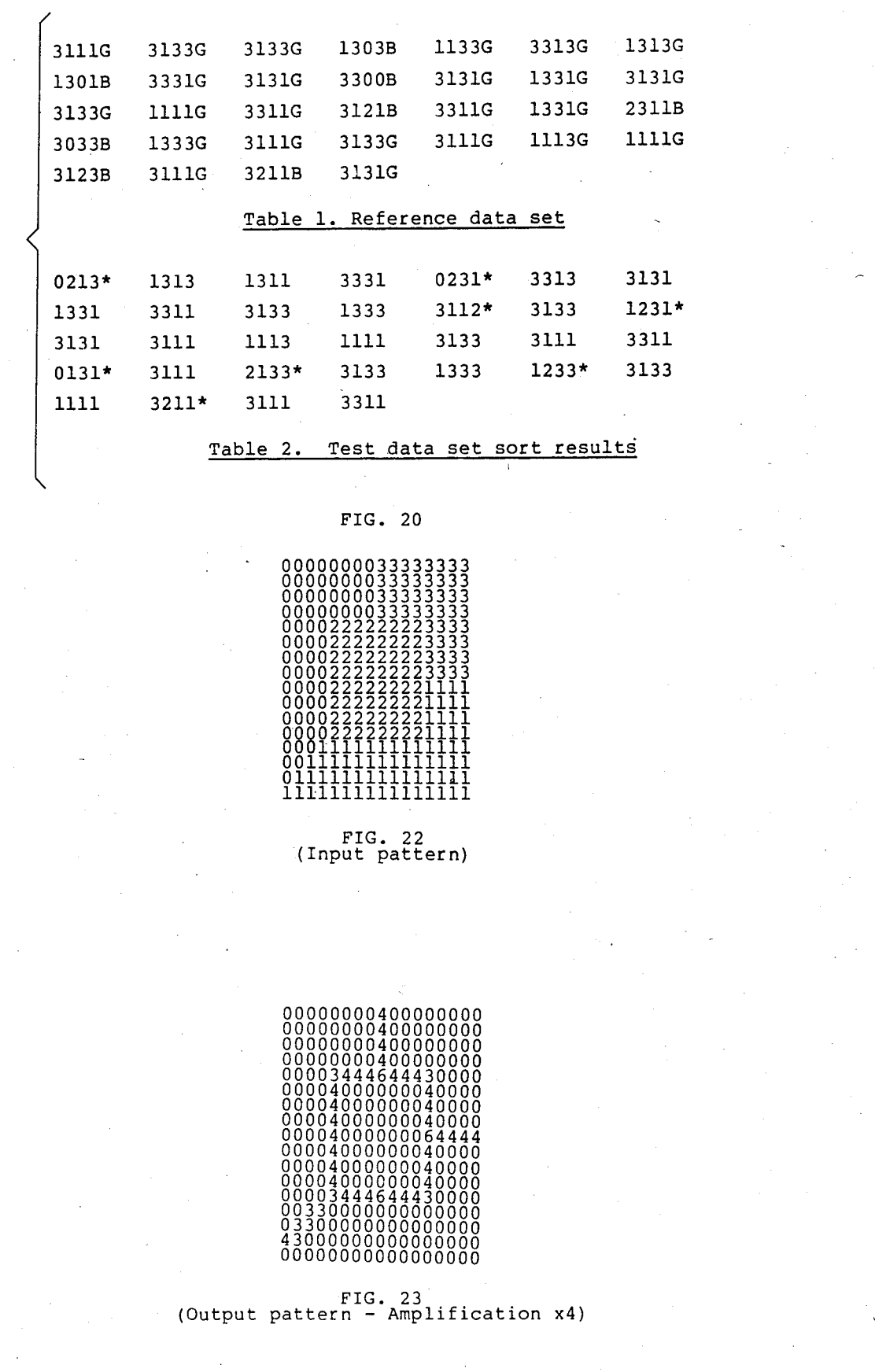

Table 1 in FIG. 20 lists the reference data set. Table 2 in FIG. 20 lists the test data set and indicates whether the system judged each unit to be acceptable or not. If the unit has been judged by the system to belong to the class of "bad" units an asterisk follows the attribute values; otherwise this space is blank.

EXAMPLE 2

A second example illustrates a somewhat different and slightly more complex quality control sorting problem. In this case, several categories of unacceptable units are identified and as many examples as possible of these categories have been included in the reference data set along with examples of acceptable units. Units which do not closely match the unacceptable models are to be assumed to be acceptable.

For this example, the measured attributes are the same as for Example 1 except that only those members of the reference set identified as types B, C, D, and E in Table 3 have been specified as being unacceptable. All 244 other permutations of unit attributes are considered to be acceptable and have been assigned to type A.

Inspection of Table 3 in FIG. 21 shows that, except for types D and E, the difference between acceptability and unacceptability is more subtle than the simple position-value attributes adequate to separate the units of Example 1. Symmetry appears to be a necessary attribute of type C and the presence of the 030 sequence is essential to be included in type B. Thus, the simple value vs position attributes used in the previous example would not be expected to be adequate for complete discrimination; additional attributes should be considered.

Recognizing the incompleteness of the simple approach, it is nevertheless important to realize that in many real processes, pre-screening to separate clearly acceptable items from questionable items is a valuable procedure. In addition, screening on inadequate criteria provides insight into which additional attributes should be included to provide complete screening. To demonstrate this aspect a separation was made using all 256 possible unit combinations and only the value vs. position attributes.

The foregoing sorting methods were implemented with discrete numerical data comprising the set of values representing the values of each attribute in a data frame, to be hereinafter referred to as primary or measure attributes. Functions of the discrete numerical data in the examples described above include pairs of values (attribute number, value) pairs and ordered pairs of values. Other attributes such as ordered triplets were also demonstrated as being useful in the sort process.

Histograms were preselected for each type of attribute of interest and each unit class (B or G in the case of Example 1; A, B, C, D, or E in the case of Example 2) and one cell of this histogram was identified with each possible value of the attribute. For the position value attributes histograms there are thus 5 histograms each of 16 cells, one histogram for each unit class and one cell in each histogram for each possible (position, value) pair. Each of the 5 ordered pair histograms also has 16 cells, one for each possible (value 1, value 2) pair. Histograms for other attributes of interest were preselected in the same manner. All histograms were initially zeroed.

Each frame of the reference data set was read in and each value in the frame values assigned to the relevant location in each histogram of interest in its class. The assigned location in each histogram was then incremented. This process was repeated until all the reference data had been read. The reference histograms were then retained for use in subsequent computations.

The values comprising the test data sets were then read in one at a time and the following function was computed for each unit class.

$$F_k = \sum_{j=1}^{J} I(T_j, R_{jk}) \qquad (17)$$

where
j is an index representing attribute type (position, value, ordered pairs, etc);
J is the number of different attribute types; and
k is an index indicating the specific reference unit class (B or G; A,B,C,D or E; etc.)

That unit class corresponding to the value of k for which $F_k$ is smallest is assumed to the class to which the test unit belongs.

Table 4 shows only those units identified by this procedure as being members of the unacceptable class (types B,C,D and E). All others were assigned to the acceptable class. None of the 12 unacceptable units were judged by this procedure to be acceptable by the system, but 56 of the 244 acceptable units were classified as unacceptable. This result appears reasonable in view of the fact that the mismatches occur in types B and C, where the properties which distinguish them were not even measured. Clearly some attributes related to these properties should be incorporated into the decision making process if a better separation is to be accomplished.

As shown in Table 5 in FIG. 21, when one additional attribute, position independent ordered pairs, was included (although this attribute is in fact not the one which would allow a unique distinction), it is close enough that the number of unnecessary rejections were cut by a factor of more than 4 over the single attribute sort. Only 11 extraneous units were assigned to class B and two extraneous to class C. No units specified as unacceptable were sorted into the acceptable class. Inclusion of additional attributes allows an even more complete sort to be accomplished.

Special allowance must be made for situations where an attribute value appearing in the test set is absent in one or more of the reference histograms, such situations being referred to as mismatches in a histogram. It is reasonable to expect mismatches because in many cases it would be unrealistic to assume that all possible data combinations could be represented in the reference data. In these situations a finite information value should be assigned to avoid an infinite information estimate.

Strictly speaking, an information value should be assigned equal to the negative logarithm of the probability of occurrence of the missing attribute value if it is known. Since in most cases it is unknown, the appropriate practical solution is to assign values which will produce the desired acceptance/rejection results. In keeping with normal production practice, one would usually want all units which show attribute values not occurring in the acceptable reference set, to be rejected. This can be accomplished by assigning a low value to mismatches in the unacceptable set and a high value to mismatches in the acceptable set.

Another general application of the system of the present invention is that of locating boundaries between more or less homogenous regions of a pattern. There are many such applications including improving coding efficiency in image transmission, recognition of logical units of speech for automatic speech recognition, and recognition of lineaments in geophysical and geological data. Prior art methods for locating such boundaries tend to focus on the use of arithmetic differences between the values of nearby points. Such prior methods often encounter difficulties because that measure which represents the property of being an interior boundary, is strongly dependent on the values assigned to represent the attributes on either side of that boundary. Also, for the system to be useful near exterior boundaries or in the neighborhood of points where data is missing, assumptions must be made regarding attribute values where data is unavailable. Lastly, conventional methods are difficult to implement when data is not available on a regular grid. These difficulties can be substantially decreased or eliminated with the present invention.

FIGS. 22 and 23 illustrate an application of the method to the location of pattern boundaries. FIG. 22 shows a test object containing a pattern consisting of four regions indicated by the discrete numerical values 0, 1, 2 and 3. FIG. 23 shows the result of applying the method to determine the location of the interior boundaries (boundaries which do not coincide with the outer edge, or exterior boundary, of the pattern), thus producing an enhanced test object in which horizontal and vertical straight lines are characterized by the value 4, triple junctions by 6, and low angle double junctions by values less than 4.

The advantages of this method are clearly visible in the output pattern where all interior boundaries (0,1), (0,2), (0,3), (1,2), (1,3), (2,3) have been identified. For example, the values of the output pattern in FIG. 23 in this instance are independent of the values of the input pattern on either side of the boundary and instead reflect the nature of the boundary itself. Also, there are no significant problems near the exterior boundaries, no assumptions regarding the attribute values beyond the exterior boundary, and no special allowances for the presence of the boundary are necessary. Lastly, although a regular grid pattern was used in the above demonstration to facilitate computations, the use of such a grid is not essential to the method.

The discrete numerical data in this implementation of the method consist of a set of values representing one or more position coordinates and one or more attributes of interest. Boundaries are characterized by the presence of a wide range of values of the other attributes with little change in the position attributes. Non-boundaries are recognized by a narrow range of values of the other attributes with little change in the position attributes. Two position attributes, horizontal and vertical position, were chosen together with one other value representing an attribute of interest such as color.

Figures 24, 26:
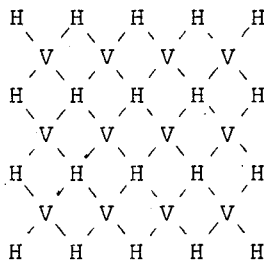
FIG. 24 illustrates the relationship between a number of histograms and the data value for a set made up of three rows and four columns of data.
FIG. 26 is a table showing use of the method of the present invention to monitor blood pressure.

Histograms were preselected to represent the frequency of occurrence of each value in four neighboring points. Thus each histogram may be considered to have a position symmetrically located in space between these points. Similarly each data value may be considered to have position coordinates symmetrically located in space between its neighboring histograms. FIG. 24 illustrates the geometrical relationship between the histograms and the data values for a data set made up of 3 rows and four columns of data.

Each data triplet was read in and assigned a location in the its associated histograms according to the above function. The assigned location in each histogram was then incremented, in this case by one. Because the test and reference data sets are one and the same, no separate test data set was required. After all data triplets for a given histogram had been read in, the following function was computed:

$$H_{ij} = I(R_{ij}\cdot R_{ij})/N(R_{ij}) \qquad (18)$$

where $R_{ij}$ refers to the four-cell value-only histogram associated with coordinates i and j, and $N(R_{ij})$ is the number of samples in this histogram.

Those values of i and j for which the function $H_{ij}$ are largest are identified as the most likely locations for boundaries between regions of comparatively little change. They may be used to generate an electrical signal which in turn may be used for such applications as controlling picture transmission, indicating the presence of lineaments and geological boundaries to assist in the search for natural resources, and indicating the presence of linguistic boundaries for computer speech recognition.

Those values of i and j for which the function $H_{ij}$ are smallest are identified as falling in regions where there is comparatively little variability in the attributes of interest. They may be used to generate an electrical signal which in turn may be used for such applications as controlling picture transmission, indicating the presence of relatively constant geological units to assist in the search for natural resources, and indicating the interior of linguistic elements for computer speech recognition.

The particular function for assigning data values to a specific histogram used in the above demonstration illustrates only one of many functions which could be used depending on the requirements of the particular application. Many other assignment functions, including those in which the histogram increment varies with distance from the histogram coordinates, could be used depending on the amount of data available, the accuracy required, and specific directions of boundaries, periodicities, or other regularities to be emphasized or ignored. The method is not to be considered restricted to two dimensional patterns, but equally well applies to the location of boundaries in spaces of any dimension greater than or equal to one.

Yet another application of the pattern analysis of the present invention is to assist in locating boundaries between more or less homogenous parts of a time varying signal. Recognition of such boundaries is important in many current areas of technology including improving coding efficiency in signal transmission, recognition of logical units of speech for automatic speech recognition, and recognizing changes of signal characteristics for earthquake and intrusion detection.

The method may be applied in either the "static reference" or "dynamic reference" mode. The pattern boundary recognition demonstration discussed elsewhere utilizes a static reference mode. An implementation of the method in a dynamic reference mode is hereafter discussed whereby the reference patterns, against which the test data are compared, are repeatedly updated during the course of the measurement.

FIG. 25 illustrates an application of the method to a problem of automatically identifying relatively stable intervals in a multi-attribute time-varying signal, and selecting one and only one time from each interval to sample the signal. Here the input data comprises a series of frames, each one representing a sound spectrum over a discrete time interval in terms of the amplitudes over twenty selected frequency bands. While in real-time applications the data would be obtained directly from a spectral analysis of the actual sound, the data here were obtained by laying a piece of graph paper over a published sound spectrogram and assigning amplitudes in the range 0 to 4 to each square, the values 0 indicating no apparent signal and 4 the highest apparent signal. The leftmost column of FIG. 24 is the relative frame number. The following four groups of five columns (each group separated by vertical bars for clarity), represent the amplitudes for each of the twenty frequency bands. Only the middle onethird of the actual data analysed is shown in FIG. 24.

The final results of this application of the method are indicated by the symbols to the right of the highest frequency band. The arrows (←) represent the frames selected as representative of the stable intervals whose approximate boundaries are indicated by a pair of dashes (--). In a typical speech recognition application the signals which caused the arrow to be printed would cause the frame to be passed on to a subsequent pattern recognition stage. The subsequent stage could also use the method to determine which in a library of known patterns were best matched by the selected frame.

In numerically implementing this application of the method of the invention, the discrete numerical data are the amplitude estimates in each of the frequency bands of interest, the values 0 to 4. A reference histogram having having one cell corresponding to each possible (frequency, data value) combination was preselected and initialized. Each data frame was first read in and each value was assigned a location in the histogram array in accordance with the above function. The input data frame was considered to be the test data set of the general description of the method, referred to hereinafter as T(k), where k identifies the sample frame obtained at time $t_k$.

In this example, the following function was computed and used as a measure of the disorder of the test signal with respect to the reference:

$$X(k) = I((pT(k)+R(k)):(pT(k)+R(k)))) \quad (19)$$

where R(k) is the reference histogram at time $t_k$, and p is a constant chosen to facilitate the computation. (Multiplication of a histogram by a scalar constant implies multiplication of the value in each cell by that constant. Addition of two histograms is done on a cell-by-cell basis.)

Since X(k) is a measure of disorder, it will tend to be high when signals are changing and low when they are not. The objective of selecting one and only one sample from each stable interval can be accomplished in a number of ways. Use was made of the fact that positive values of the second derivative of X(k) will occur during an interval of change and negative values will occur as the signal is stabilizing. The first derivative is approximated by $$X_1(k) = X(k) - X(k-1) \quad (20)$$

and the second derivative by $$X_2(k) = X_1(k) - X_1(k-1) \quad (21)$$

The values of X(k), $X_1(k)$, and $X_2(k)$, are shown as the rightmost three columns in FIG. 24. As an appropriate time to sample, the first occurrence of a negative value of $X_2(k)$ following a positive value, was selected.

The reference histogram was kept current and prevented from overflowing by a two-step process. Firstly, each element of the histogram R(k) was decreased by an amount equal to a preselected fraction of the current value of the element. The fraction being used controls the extent to which "memory" of past states decays. This produced a "reduced" reference histogram R'(k). Secondly, the elements of the test and reduced reference histograms were added together to form a new reference histogram according to the formula $$R(k+1) = pT(k) + R'(k) \quad (22)$$

Other approaches such as the use of a FIFO buffer as in the pressure monitor demonstration described hereinafter could also be used to keep the reference histogram current. A new test data frame T(k+1) is then read in and the above process repeated.

Another typical example of the implementation of the pattern analysis method in a dynamic reference mode is its use for continuously calculating and displaying the range of pressure sensed by a blood pressure measuring device.

The objective in such instance is one of continually finding and displaying extreme (high and low values) in a time series. While at first glance this appears to be a simple problem solvable by deterministic programming techniques, in fact the frequent presence of local minima near the true maximum values and local maxima near the true minimum values usually makes it necessary to incorporate relatively complicated programs in the device to cope with these special but not unusual situations. On the other hand, a semi-skilled person observing an analog representation of the blood pressure as a function of time would have little difficulty in correctly determining the range. This is one of a class of applications where the pattern analysis method produces better results than conventional time-series analysis techniques because it more closely mimics human interpretation.

The applications of the method to this type of problem can be demonstrated on several sets of discrete numerical data simulating signals with the following characteristics:

1. A fundamental period which lies in the range between 20 time sample intervals to 600 time sample intervals (frequency varies from 10 cycles/minute to 300 cycles per minute at a sampling frequency of 100 hz;
2. Amplitude between 1 to 250 resolution elements;
3. RMS white noise amplitude of 1 resolution element;

The simulations demonstrate the following desirable properties of the output: a rapid response, particularly for low amplitude signals; a robust measure of the signal range between extrema; reasonably good precision on the actual range; insensitivity to occasional "noise"; and potential for pattern change recognition. The pattern analysis method differs from the conventional deterministic approach of range measurement in using the statistical properties of the entire signal. It emphasizes robust estimates of this range at the expense of a certain amount of precision in the exact value.

The discrete numerical data in implementation of this application of the method of the invention represent single pressure values sampled at discrete time intervals (typically 0.01 seconds), each value having the attribute of amplitude.

Amplitude was quantized into intervals of one resolution element for mapping into a histogram according to the function $$i = p/\Delta p + 0.5 \quad (23)$$
$$0 < i < 257$$

where
  i is greatest integer less than the value of the right side of the equation;
  p is the pressure; and
  $\Delta p$ is the resolution element.

One histogram with 256 resolution elements, adequate to cover the expected range of blood pressures, was preselected and zeroed. Each data value was read in and assigned a location in the histogram according to the preselected function above. The assigned histogram location was then incremented by one. The histogram was kept current and prevented from overflowing by maintaining successive data values in a FIFO (first in/first out) buffer with a prescribed time delay (typically about ten seconds). After the buffer was filled, as each sample emerged from the buffer its corresponding location in the histogram was decremented. In this case, the test data set and the reference data set are one and the same, so no separate test data set was required.

Periodically (typically about once per second) the entropy H of the array defined by the following function was computed:

$$H(R:R) = I(R:R)/N(R) \quad (24)$$

where R refers to the reference histogram.

The entropy was then used to compute the width function, w, defined by $$log(w) = H(R:R) - log(\Delta p) \quad (25)$$

where $\Delta p$ is the pressure resolution used in the histogram, and the logarithms are take to the same base as used in computation of the information value. Cf. Robert K. McConnell, Jr., "Minimum Description Analysis of Faulted Data Sets", paper presented to the Canadian Explor. Geophy. Soc. - American Geophy. Union, Mining Geophy. Symposium, Toronto, Canada, May 22-23, 1980, reprinted in *Entropy Minimax Sourceboook*, V. 4, Ed. by R. Christensen, Entropy Limited, Lincoln, Mass., 1981, pp. 545-570, and "Distribution Width: an Alternative to Variance", submitted to *Science,* 1981. Note that the width function is a statistical measure of the separation of maxima and minima in the signal taken over a large number of cycles. That signal in this instance varies periodically between maxima and minima and is confused by a large amount of noise. The two extrema are estimated to lie at one half the width function to either side of some measure of the central tendency, in this case the median pressure. The results are shown in the table set forth in FIG. 26.

Since certain changes may be made in the above processes and apparatus without departing from the scope of the invention herein involved, it is intended that all matter contained in the above description or shown in the accompanying drawing shall be interpreted in an illustrative and not in a limiting sense.

What is claimed is:

1. A method of recognizing a pattern in a test object, said method comprising the steps of:
   specifying properties characteristic of said pattern;
   specifying discrete ranges of values of said properties;
   measuring the values of said properties in said test object;
   arranging the measured values in at least one test histogram;
   determining a reference set of values of said properties and arranging said set as at least a first reference histogram; and
   comparing said test and reference histograms by determination of the value of a function which provides a measure of the amount of information necessary to express said at least one test histogram in terms of the optimum code for describing at least said first reference histogram.

2. A method as defined in claim 1 including the steps of digitizing said reference set of values and said measured values prior to aranging same in said respective reference and test histograms.

3. A method as defined in claim 1 wherein
   said step of determining said reference set of values includes arranging said set in a plurality of reference histograms,
   said step of comparing includes comparing said plurality of reference histograms with said test histogram by determination of, for each such comparison, the value of a function which provides a measure of the amount of information necessary to express said test histogram in terms of each of said reference histograms; and
   said method further including the step of selecting that one of said plurality of reference histograms which provides for said function a value bearing a predetermined relationship to a desired value.

4. A method as defined in claim 1 wherein
   said test object is one of a plurality of test objects,
   said step of measuring includes measuring the values of said properties for each of said test objects,
   said step of arranging includes arranging the measured values of said properties in a plurality of test histograms,
   said step of comparing includes comparing said plurality of test histograms with said first reference histogram by determination, for each such comparison, of the value of a function which provides a measure of the amount of information necessary to express each of said test histograms in terms of said first reference histogram; and
   said method further including the step of selecting that one of said plurality of test histograms which provides for said function a value bearing a predetermined relationship to a desired value.

5. A method of recognizing a pattern in a test object, said method comprising the steps of:
   specifying properties characteristic of said pattern;
   specifying discrete ranges of values of said properties,
   measuring the values of said properties in said test object;
   determining the number of such measured values falling in each said discrete range and arranging such number in each said range in at least one test histogram;
   determining a reference set of values of said properties and arranging said set as at least a first reference histogram; and
   comparing said test and reference histograms by determination of the value of a function which provides a measure of the amount of information necessary to express said at least one test histogram in terms of the optimum code for describing at least said first reference histogram.

6. A method as defined in claim 5 wherein said step of determining said reference set of values comprises taking a plurality of measurements of one or more of said objects and summing said plurality of measurements to derive said reference set of values.

7. A method as defined in claim 5 wherein said measured values are arranged into a plurality of said test histograms, and said step of comparing determines which of said plurality of test histograms when compared to said at least one reference histogram provides a minimum value of said function.

8. A method as defined in claim 5 wherein said reference set of values is arranged into a plurality of said reference histograms, and said step of comparing determines which of said plurality of reference histograms when compared with said at least one test histogram provides a minimum value of said function.

9. A method as defined in claim 1 including the step of
   generating a signal, based upon the result of the comparison of histograms.

10. A method as defined in claim 1 wherein said properties comprise (a) positions in a field of view, and (b) the nature of a signal arising from a unit area of said field at each of said positions.

11. A method as defined in claim 10 wherein each of said positions in said field of view is defined in terms of location within a rectangular array of positions.

12. A method as defined in claim 10 wherein each of said positions in said field of view is defined in terms of location in one of a series of concentric rings.

13. A method as defined in claim 10 wherein each of said positions in said field of view is defined in terms of location within an angular sector around a center within said field.

14. A method as defined in claim 10 wherein said nature of said signal is the intensity thereof.

15. A method as defined in claim 10 wherein the nature of said signal is the wavelength range thereof.

16. A method as defined in claim 10 wherein each of said positions in said field of view is defined in terms of location in adjacent rows.

17. A method as defined in claim 10 wherein each of said positions is defined in terms of adjacent columns.

18. A method as defined in claim 10 wherein said properties comprise the number of selected points in said field of view having a value falling within each of said discrete ranges.

19. A method as defined in claim 1 wherein said properties comprise (a) edges of said test object and (b) the slope of said edges at selected points.

20. A method as defined in claim 1 wherein the values in at least one of said histograms are sums of weighted values of a given sequence of values.

21. A method as defined in claim 20 wherein said at least one histogram is said test histogram.

22. A method as defined in claim 20 wherein said at least one of said histograms is said reference histogram.

23. A method as defined in claim 1 wherein the values in both said refence and test histograms are sums of weighted values of given sequences of values.

24. A method as defined in claim 1 wherein said function is I(T:R) and is defined as $$I(T:R) = - \sum_{i=1}^{Q} m_i \cdot \log_b(p_i);$$

where
T is a test histogram;
R is a reference histogram;
I(T:R) is the information of T expressed in terms of R;
b is the base of the logarithm;
$m_i$ is the number of occurrences of the ith symbol in T;
$p_i$ is the probability of the ith symbol occurring in R; and
Q is the number of different symbols in T.

25. A method as defined in claim 1 wherein said function is I(T:T) and is defined as $$I(T:T) = - \sum_{i=1}^{Q} m_i \cdot \log_b(p_i');$$

where
T is a test histogram;
I(T:T) is the information of T expressed in terms of T;
b is the base of the logarithm;
$m_i$ is the number of occurrences of the ith symbol in T;
$p_i'$ is the probability of the ith symbol occurring in T; and
Q is the number of different symbols in T.

26. A method as defined in claim 1 wherein said function is H(T:R) and is defined as $$H(T:R) = -1/M \sum_{i=1}^{Q} m_i \cdot \log_b(p_i);$$

where
T is a test histogram;
R is a reference histogram;
H(T:R) is the entropy of T expressed in terms of R;
b is the base of the logarithm;
$m_i$ is the number of occurrences of the ith symbol in T;
$p_i$ is the probability of the ith symbol occurring in R;
Q is the number of different symbols in T; and $$M = \sum_{i=1}^{Q} m_i.$$

27. A method as defined in claim 1 wherein said function is H(T:T) and is defined as $$H(T:T) = -1/M \sum_{i=1}^{Q} m_i \cdot \log_b(p_i');$$

where
T is a test histogram;
H(T:T) is the entropy of T expressed in terms of T;
b is the base of the logarithm;
$m_i$ is the number of occurrences of the ith symbol in T;
$p_i'$ is the probability of the ith symbol occurring in T;
Q is the number of different symbols in T; and $$M = \sum_{i=1}^{Q} m_i.$$

28. A method as defined in claim 1 wherein said function is

I(T:R)−I(T:T)

where $$I(T:R) = - \sum_{i=1}^{Q} m_i \cdot \log_b(p_i);$$

T is a test histogram;
R is a reference histogram;
I(T:R) is the information of T expressed in terms of R;
b is the base of the logarithm;
$m_i$ is the number of occurrences of the ith symbol in T;
$p_i$ is the probability of the ith symbol occurring in R;
Q is the number of different symbols in T;

$$I(T:T) = - \sum_{i=1}^{Q} m_i \cdot \log_b(p_i');$$

I(T:T) is the information of T expressed in terms of T, and
$p_i'$ is the probability of the ith symbol occurring in T.

29. A method as defined in claim 1 wherein said function is

H(T:R)−H(T:T)

where $$H(T:R) = -1/M \sum_{i=1}^{Q} m_i \cdot \log_b(p_i);$$

T is a test histogram;
R is a reference histogram;
H(T:R) is the entropy of T expressed in terms of R;
b is the base of the logarithm;
$m_i$ is the number of occurrences of the ith symbol in T;

$p_i$ is the probability of the ith symbol occurring in R;
Q is the number of different symbols in T;

$$M = \sum_{i=1}^{Q} m_i;$$

$$H(T:T) = -1/M \sum_{i=1}^{Q} m_i \cdot \log_b(p_i');$$

H(T:T) is the entropy of T expressed in terms of T; and $p_i'$ is the probability of the ith symbol occurring in T.

30. A method as defined in claim 1 wherein said function is

I(T:R)−I(R:R)

where $$I(T:R) = -\sum_{i=1}^{Q} m_i \cdot \log_b(p_i);$$

T is a test histogram;
R is a reference histogram;
I(T:R) is the information of T expressed in terms of R;
b is the base of the logarithm;
$m_i$ is the number of occurrences of the ith symbol in T;
$p_i$ is the probability of the ith symbol occurring in R;
Q is the number of different symbols in T;

$$I(R:R) = -\sum_{i=1}^{Q} n_i \cdot \log_b(p_i);$$

I(R:R) is the information of R expressed in terms of R, and
$n_i$ is the number of occurrences of the ith symbol in R.

31. A method as defined in claim 1 wherein said function is

H(T:R)−H(R:R)

where $$H(T:R) = -1/M \sum_{i=1}^{Q} m_i \cdot \log_b(p_i);$$

T is a test histogram;
R is a reference histogram;
H(T:R) is the entropy of T expressed in terms of R;
b is the base of the logarithm;
$m_i$ is the number of occurrences of the ith symbol in T;
$p_i$ is the probability of the ith symbol occurring in R;
Q is the number of different symbols in T;

$$M = \sum_{i=1}^{Q} m_i;$$

$$H(R:R) = -1/N \sum_{i=1}^{Q} n_i \cdot \log_b(p_i);$$

H(R:R) is the entropy of R expressed in terms of R;

$$N = \sum_{i=1}^{Q} n_i;$$ and $n_i$ is the number of occurrences of the ith symbol in R.

32. A method as defined in claim 9 wherein said signal is generated when said value of said function is found to be below a predetermined value.

33. A method as defined in claim 9 wherein said signal is generated when said value is found to be at a minimum.

34. A method as defined in claim 9 wherein said signal is generated when said value is found to be at a maximum.

35. A method as defined in claim 9 wherein said signal is generated when said value is found to be above a predetermined value.

36. A method as defined in claim 1 wherein the step of measuring includes establishing test object measurement coordinates to define said values of properties in said test object, and further wherein the value of said function is assigned to locations among said test object measurement coordinates so as to produce an enhanced test object.

37. A method as defined in claim 36 including the steps of forming a digitized image of said test object; and wherein said function is H(T:T) and is defined as $$H(T:T) = -1/M \sum_{i=1}^{Q} m_i \cdot \log_b(p_i');$$

wherein T is a test histogram;
H(T:T) is the entropy of T expressed in terms of T;
b is the base of the logarithm;
$m_i$ is the number of occurrences is the ith symbol in T;
$p_i'$ is the probability of the ith symbol occurring in T;
Q is the number of different symbols in T;

$$M = \sum_{i=1}^{Q} m_i$$

and wherein said properties are (a) position in a field of view of said test object, and (b) the nature of the signals arising from said position, said comparison values are assigned to a position at the geometric center of said field of view, and said field is scanned over the original digitized image to produce an enhanced digitized image.

38. Apparatus for recognizing a pattern in a test object, said apparatus comprising, in combination:
means for measuring in said test object the values of specified properties characteristic of said pattern,
means for arranging the measured values of said properties in at least one test histogram;
means for storing a reference set of values of said specified properties as at least a first reference histogram;
means for comparing said test and reference histograms by determination of the value of a function which provides a measure of the amount of information necessary to express said at least one test histogram in terms of the optimum code for describing at least said first reference histogram.

39. Apparatus as defined in claim 38 including means for digitizing said reference set of values and said measured values prior to aranging same in said respective reference and test histograms.

40. Apparatus according to claim 38 wherein said means for measuring comprises means for scanning said test object.

41. Apparatus according to claim 40 wherein said means for scanning is an optical scanner.

42. Apparatus according to claim 39 wherein said means for arranging said measured values comprises digital counter means.

43. Apparatus according to claim 39 wherein said means for storing said reference set comprises digital memory means.

44. Apparatus according to claim 39 wherein said means for comparing comprises digital computer means programmed to determine the value of said function.

45. Apparatus according to claim 38 wherein said function is I(T:R) and is defined as $$I(T:R) = - \sum_{i=1}^{Q} m_i \cdot \log_b(p_i);$$

where
T is a test histogram;
R is a reference histogram;
I(T:R) is the information of T expressed in terms of R;
b is the base of the logarithm;
$m_i$ is the number of occurrences of the ith symbol in T;
$p_i$ is the probability of the ith symbol occurring in R; and
Q is the number of different symbols in T.

46. Apparatus according to claim 38 wherein said function is I(T:T) and is defined as $$I(T:T) = - \sum_{i=1}^{Q} m_i \cdot \log_b(p_i');$$

where
T is a test histogram;
I(T:T) is the information of T expressed in terms of T;
b is the base of the logarithm;
$m_i$ is the number of occurrences of the ith symbol in T;
$p_i'$ is the probability of the ith symbol occurring in T; and
Q is the number of different symbols in T.

47. Apparatus according to claim 38 wherein said function is H(T:R) and is defined as $$H(T:R) = -1/M \sum_{i=1}^{Q} m_i \cdot \log_b(p_i);$$

where
T is a test histogram;
R is a reference histogram;
H(T:R) is the entropy of T expressed in terms of R;
b is the base of the logarithm;
$m_i$ is the number of occurrences of the ith symbol in T;
$p_i$ is the probability of the ith symbol occurring in R;
Q is the number of different symbols in T; and $$M = \sum_{i=1}^{Q} m_i.$$

48. Apparatus according to claim 38 wherein said function is H(T:T) and is defined as $$H(T:T) = -1/M \sum_{i=1}^{Q} m_i \cdot \log_b(p_i');$$

where
T is a test histogram;
H(T:T) is the entropy of T expressed in terms of T;
b is the base of the logarithm;
$m_i$ is the number of occurrences of the ith symbol in T;
$p_i'$ is the probability of the ith symbol occurring in T;
Q is the number of different symbols in T; and $$M = \sum_{i=1}^{Q} m_i.$$

49. Apparatus according to claim 38 wherein said function is

I(T:R)−I(T:T)

where $$I(T:R) = - \sum_{i=1}^{Q} m_i \cdot \log_b(p_i);$$

T is a test histogram;
R is a reference histogram;
I(T:R) is the information of T expressed in terms of R;
b is the base of the logarithm;
$m_i$ is the number of occurrences of the ith symbol in T;
$p_i$ is the probability of the ith symbol occurring in R;
Q is the number of different symbols in T;

$$I(T:T) = - \sum_{i=1}^{Q} m_i \cdot \log_b(p_i');$$

I(T:T) is the information of T expressed in terms of T; and
$p_i'$ is the probability of the ith symbol occurring in T.

50. Apparatus according to claim 38 wherein said function is

H(T:R)−H(T:T)

where $$H(T:R) = -1/M \sum_{i=1}^{Q} m_i \cdot \log_b(p_i);$$

T is a test histogram;
R is a reference histogram;
H(T:R) is the entropy of T expressed in terms of R;
b is the base of the logarithm;
$m_i$ is the number of occurrences of the ith symbol in T;
$p_i$ is the probability of the ith symbol occurring in R;
Q is the number of different symbols in T;

$$M = \sum_{i=1}^{Q} m_i;$$

$$H(T:T) = -1/M \sum_{i=1}^{Q} m_i \cdot \log_b(p_i');$$

H(T:T) is the entropy of T expressed in terms of T, and $p_i'$ is the probability of the ith symbol occurring in T.

51. Apparatus according to claim 38 wherein said function is $$I(T:R) - I(R:R)$$

where $$I(T:R) = - \sum_{i=1}^{Q} m_i \cdot \log_b(p_i);$$

T is a test histogram;
R is a reference histogram;
I(T:R) is the information of T expressed in terms of R;
b is the base of the logarithm;
$m_i$ is the number of occurrences of the ith symbol in T;
$p_i$ is the probability of the ith symbol occurring in R;
Q is the number of different symbols in T;

$$I(R:R) = - \sum_{i=1}^{Q} n_i \cdot \log_b(p_i);$$

I(R:R) is the information of R expressed in terms of R, and $n_i$ is the number of occurrences of the ith symbol in R.

52. Apparatus according to claim 38 wherein said function is $$H(T:R) - H(R:R)$$

where $$H(T:R) = -1/M \sum_{i=1}^{Q} m_i \cdot \log_b(p_i);$$

T is a test frequency histogram;
R is a reference histogram;
H(T:R) is the entropy of T expressed in terms of R;
b is the base of the logarithm;
$m_i$ is the number of occurrences of the ith symbol in T;
$p_i$ is the probability of the ith symbol occurring in R;
Q is the number of different symbols in T;

$$M = \sum_{i=1}^{Q} m_i;$$

$$H(R:R) = -1/N \sum_{i=1}^{Q} n_i \cdot \log_b(p_i);$$

H(R:R) is the entropy of R expressed in terms of $$N = \sum_{i=1}^{Q} n_i; \text{ and}$$

$n_i$ is the number of occurrences of the ith symbol in R.

* * * * *

UNITED STATES PATENT AND TRADEMARK OFFICE
CERTIFICATE OF CORRECTION

PATENT NO. : 4,567,610

DATED : January 28, 1986

INVENTOR(S) : Robert K. McConnell

It is certified that error appears in the above-identified patent and that said Letters Patent is hereby corrected as shown below:

Claim 2, column 23, line 43, please delete "aranging" and substitute therefor -- arranging --;

Claim 23, column 25, line 21, please delete "refence" and substitute therefor -- reference --;

Claim 37, column 28, line 34, please delete "wherein" and substitute therefor -- where --;

Claim 37, column 28, line 37, please delete "is" (second occurrence) and substitute therefor -- of --;

Claim 37, column 28, line 45, please delete "position" and substitute therefor -- positioned --;

Claim 38, column 28, line 60, after "histogram;", please insert -- and --;

Claim 39, column 29, line 1, please delete "aranging" and substitute therefor -- arranging --; and

UNITED STATES PATENT AND TRADEMARK OFFICE
CERTIFICATE OF CORRECTION

PATENT NO. : 4,567,610

DATED : January 28, 1986

INVENTOR(S) : Robert K. McConnell

It is certified that error appears in the above-identified patent and that said Letters Patent is hereby corrected as shown below:

Claim 52, column 32, line 30, after "of" (second occurrence) insert -- R --.

Signed and Sealed this

Twenty-fourth Day of June 1986

[SEAL]

Attest:

Attesting Officer

DONALD J. QUIGG

Commissioner of Patents and Trademarks